United States Patent
Spangler et al.

(10) Patent No.: US 12,057,093 B1
(45) Date of Patent: Aug. 6, 2024

(54) HINGE ASSEMBLY FOR STRINGED MUSICAL INSTRUMENT

(71) Applicant: Ciari Guitars, Inc., San Diego, CA (US)

(72) Inventors: Jonathan Spangler, San Diego, CA (US); David Weckerly, Knox, PA (US)

(73) Assignee: Ciari Guitars, Inc., San Diego, CA (US)

( * ) Notice: Subject to any disclaimer, the term of this patent is extended or adjusted under 35 U.S.C. 154(b) by 120 days.

(21) Appl. No.: 17/556,914

(22) Filed: Dec. 20, 2021

Related U.S. Application Data

(60) Provisional application No. 63/129,399, filed on Dec. 22, 2020.

(51) Int. Cl.
| | |
|---|---|
| *G10D 3/095* | (2020.01) |
| *G06F 1/16* | (2006.01) |
| *G10D 1/08* | (2006.01) |

(52) U.S. Cl.
CPC ............... *G10D 3/095* (2020.02); *G06F 1/16* (2013.01); *G10D 1/085* (2013.01)

(58) Field of Classification Search
CPC .... E05D 3/06; E05D 3/12; E05D 5/04; E05D 5/06; E05D 7/0018; G10D 3/095
USPC .................................. 16/374, 375, 388, 387
See application file for complete search history.

(56) References Cited

U.S. PATENT DOCUMENTS

| | | | | |
|---|---|---|---|---|
| 727,697 A | * | 5/1903 | Sargent ..................... | E05D 3/00 16/283 |
| 796,113 A | * | 8/1905 | Corbett ..................... | E05D 3/12 16/366 |
| 966,380 A | * | 8/1910 | Bommer ................. | E05D 11/04 16/283 |
| 1,418,076 A | * | 5/1922 | Hedstrom ................. | E05D 3/12 16/302 |
| 1,554,161 A | * | 9/1925 | Hubbard ................... | E05D 3/06 16/368 |
| 2,200,692 A | * | 5/1940 | Fairley ..................... | E05D 3/12 49/192 |
| 2,277,176 A | * | 3/1942 | Wagner ..................... | E05D 3/12 16/366 |
| 2,372,431 A | * | 3/1945 | Kahle ....................... | E05D 3/12 16/389 |
| 2,440,817 A | * | 5/1948 | Benson ..................... | E05D 3/12 16/302 |
| 3,832,756 A | * | 9/1974 | Lew ......................... | E05D 3/12 16/371 |
| 4,034,514 A | * | 7/1977 | Cecil ........................ | E06B 1/52 49/504 |
| 4,073,211 A | * | 2/1978 | Jorgensen ................ | G10D 1/08 984/106 |

(Continued)

*Primary Examiner* — Jeffrey O'Brien
(74) *Attorney, Agent, or Firm* — Jonathan D. Spangler; Jay B. Bell

(57) ABSTRACT

A hinge assembly having reinforced abutment surfaces for use in a neck of a foldable fretted instrument. Multiple strike plates are mounted to the hinge assembly, which are made from stronger and more robust materials than the underlying hinge such that the strike plates bear the loads (vs. the underlying hinge material) to prevent deformation of the hinge components during use over time. An elongated locking strut is dimensioned to be slidably advanced into the hinge assembly to selectively lock and unlock the neck of the foldable fretted instrument.

20 Claims, 24 Drawing Sheets

(56) References Cited

U.S. PATENT DOCUMENTS

| | | | | |
|---|---|---|---|---|
| 4,118,827 A * | 10/1978 | Yamamoto | ............... | E05D 7/02 49/501 |
| 4,547,930 A * | 10/1985 | King | ............... | E05D 5/023 16/382 |
| 4,553,286 A * | 11/1985 | Schwarz, II | ............... | E05D 5/04 16/382 |
| 4,873,908 A * | 10/1989 | Moore | ............... | G10D 1/085 84/2 |
| 5,137,389 A * | 8/1992 | Magoon | ............... | F16B 2/08 403/188 |
| 5,233,896 A * | 8/1993 | Worthington | ............... | G10D 1/08 84/293 |
| 5,353,672 A * | 10/1994 | Stewart | ............... | G10D 3/06 84/293 |
| 5,390,578 A * | 2/1995 | Raymer | ............... | G10D 1/085 84/293 |
| 5,659,929 A * | 8/1997 | Cheng | ............... | E05D 3/12 16/366 |
| 5,876,092 A * | 3/1999 | An | ............... | B64D 11/0638 297/146 |
| 5,943,739 A * | 8/1999 | Vandergriff | ............... | E05D 11/00 16/221 |
| 6,152,554 A * | 11/2000 | Parisi | ............... | E05D 11/1078 16/249 |
| 6,154,926 A * | 12/2000 | Formiller | ............... | E05D 5/04 49/389 |
| 6,243,920 B1 * | 6/2001 | Sauve | ............... | E05D 3/18 16/361 |
| 6,256,839 B1 * | 7/2001 | Wu | ............... | E05F 1/1215 16/302 |
| D516,114 S * | 2/2006 | Leach | ............... | G10D 1/08 D17/20 |
| 6,994,393 B2 | 2/2006 | Votruba | ............... | E05B 83/16 296/100.09 |
| 7,416,364 B2 * | 8/2008 | Yodock, III | ............... | E01F 15/083 404/9 |
| 7,533,448 B2 * | 5/2009 | Chern | ............... | G06F 1/1681 16/342 |
| 7,617,567 B2 * | 11/2009 | Franchini | ............... | E05D 7/04 16/382 |
| 7,652,205 B2 * | 1/2010 | Leach | ............... | G10D 1/08 84/293 |
| 7,696,419 B2 * | 4/2010 | Chadwick, V | ............... | G10D 1/08 84/274 |
| 7,748,081 B2 * | 7/2010 | Ganter | ............... | E05D 7/04 16/385 |
| 7,754,950 B2 * | 7/2010 | Leach | ............... | G10D 1/08 16/369 |
| 7,872,185 B1 * | 1/2011 | Chadwick | ............... | G10D 1/08 84/293 |
| 8,119,892 B2 * | 2/2012 | Leach | ............... | G10D 1/08 84/293 |
| 8,273,974 B1 * | 9/2012 | Gonzalez | ............... | G10D 1/085 84/293 |
| 8,720,011 B1 * | 5/2014 | Hsu | ............... | E05D 3/122 16/354 |
| 8,835,730 B2 * | 9/2014 | Bagale | ............... | G10D 1/08 84/293 |
| 9,213,366 B2 * | 12/2015 | Lai | ............... | G06F 1/162 |
| 9,424,818 B1 * | 8/2016 | Spangler | ............... | G10D 1/08 |
| 9,556,665 B2 * | 1/2017 | Ritzert | ............... | E06B 3/10 |
| 9,617,782 B2 * | 4/2017 | Gramstad | ............... | E05D 5/04 |
| 9,816,303 B2 * | 11/2017 | Lee | ............... | E05D 5/0276 |
| 9,865,234 B2 * | 1/2018 | Denton | ............... | G10D 3/06 |
| 10,186,238 B2 * | 1/2019 | Spangler | ............... | G10H 3/186 |
| 10,246,917 B2 * | 4/2019 | Ginter | ............... | E05D 3/08 |
| 10,810,974 B2 * | 10/2020 | Spangler | ............... | G10D 3/18 |
| 11,120,776 B2 * | 9/2021 | Spangler | ............... | G10D 3/06 |
| 11,268,310 B1 * | 3/2022 | Spangler | ............... | E05D 5/06 |
| 11,404,032 B2 * | 8/2022 | Spangler | ............... | G10D 3/095 |
| 11,631,386 B2 * | 4/2023 | Spangler | ............... | G10D 3/06 84/291 |
| 2004/0020011 A1 * | 2/2004 | Fang | ............... | E05F 1/1215 16/302 |
| 2004/0212968 A1 * | 10/2004 | Lin | ............... | G06F 1/1681 361/755 |
| 2005/0257344 A1 * | 11/2005 | Allen | ............... | D06F 81/02 16/371 |
| 2006/0090297 A1 * | 5/2006 | Chue | ............... | E05D 5/04 16/312 |
| 2018/0211639 A1 * | 7/2018 | Niiro | ............... | G10D 1/085 |
| 2020/0011105 A1 * | 1/2020 | Gasser | ............... | E06B 3/88 |
| 2020/0118528 A1 * | 4/2020 | Upton | ............... | G10D 3/095 |
| 2021/0056939 A1 * | 2/2021 | Spangler | ............... | G10D 1/00 |

* cited by examiner

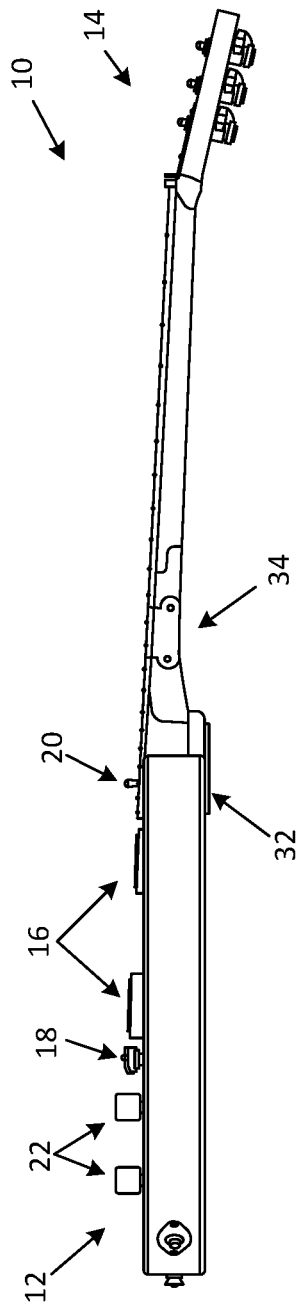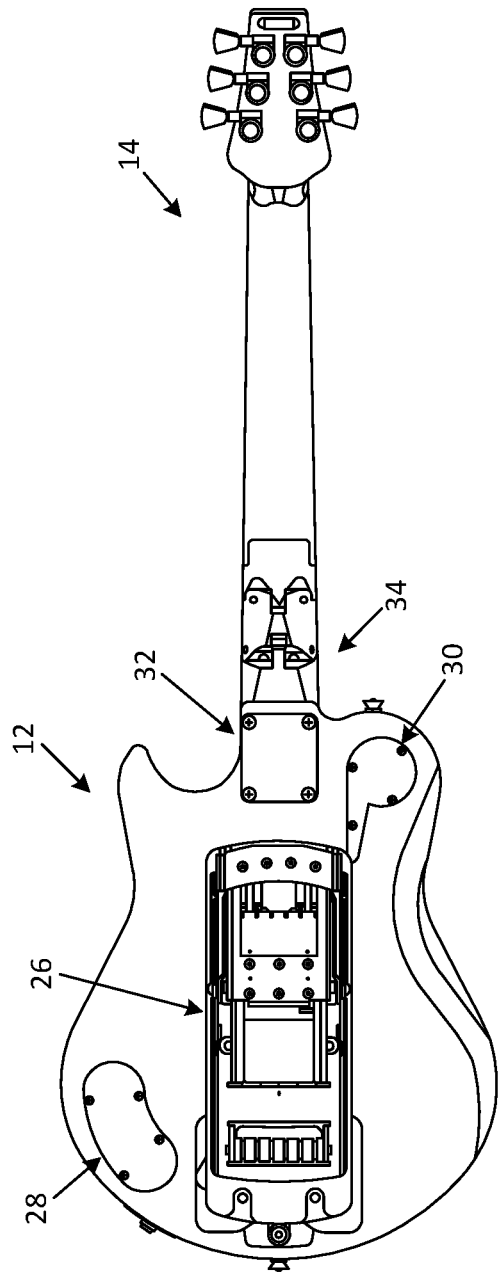

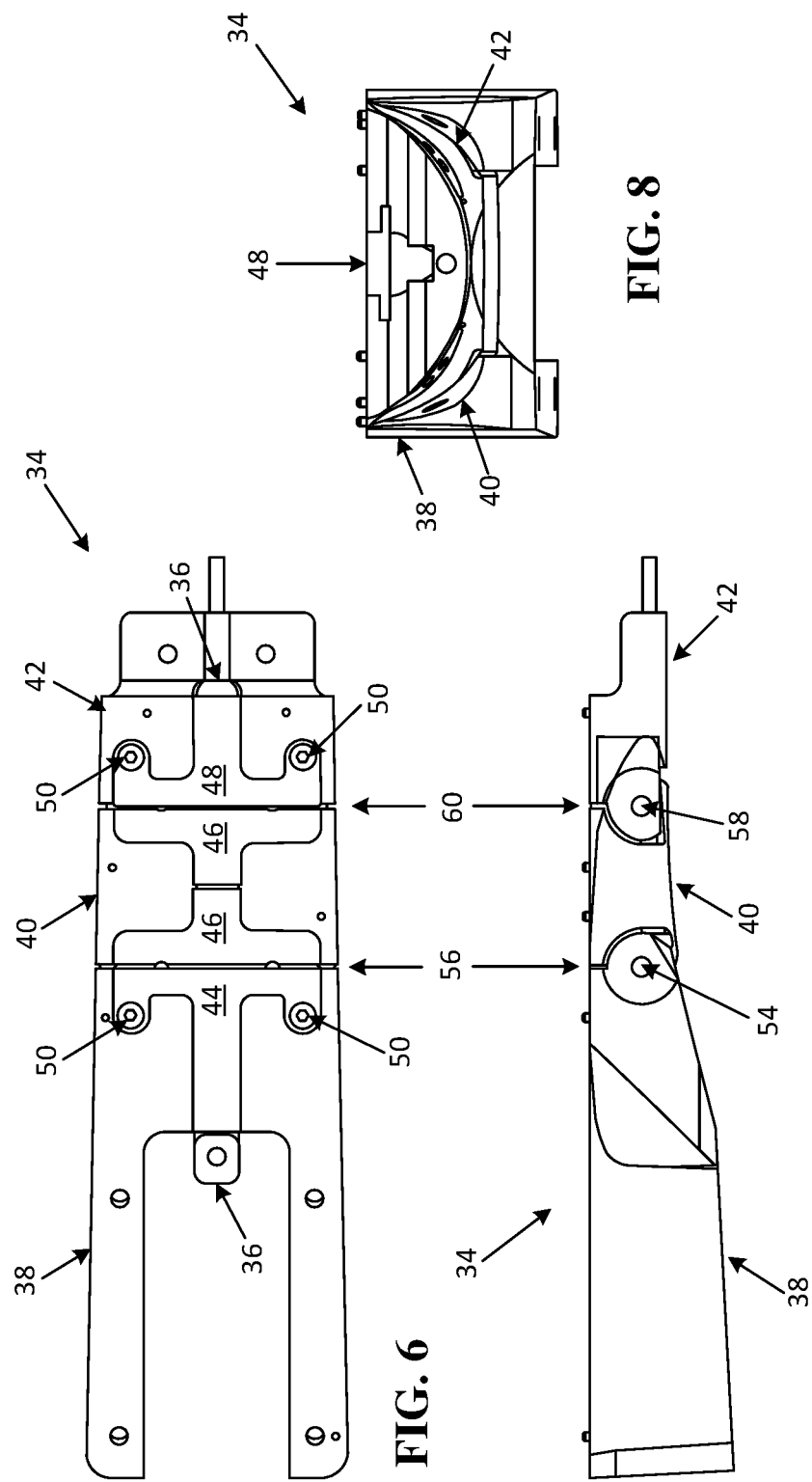

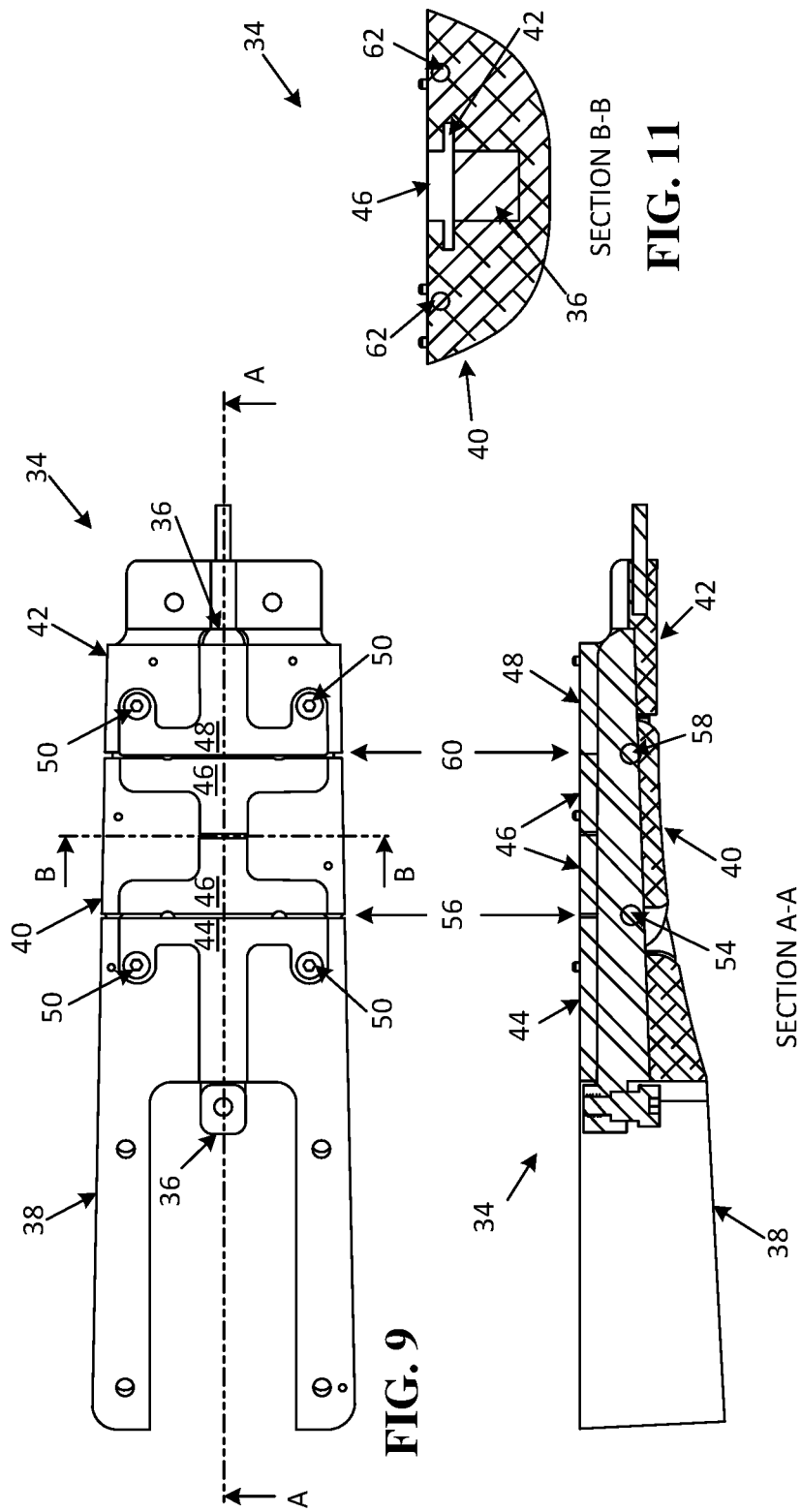

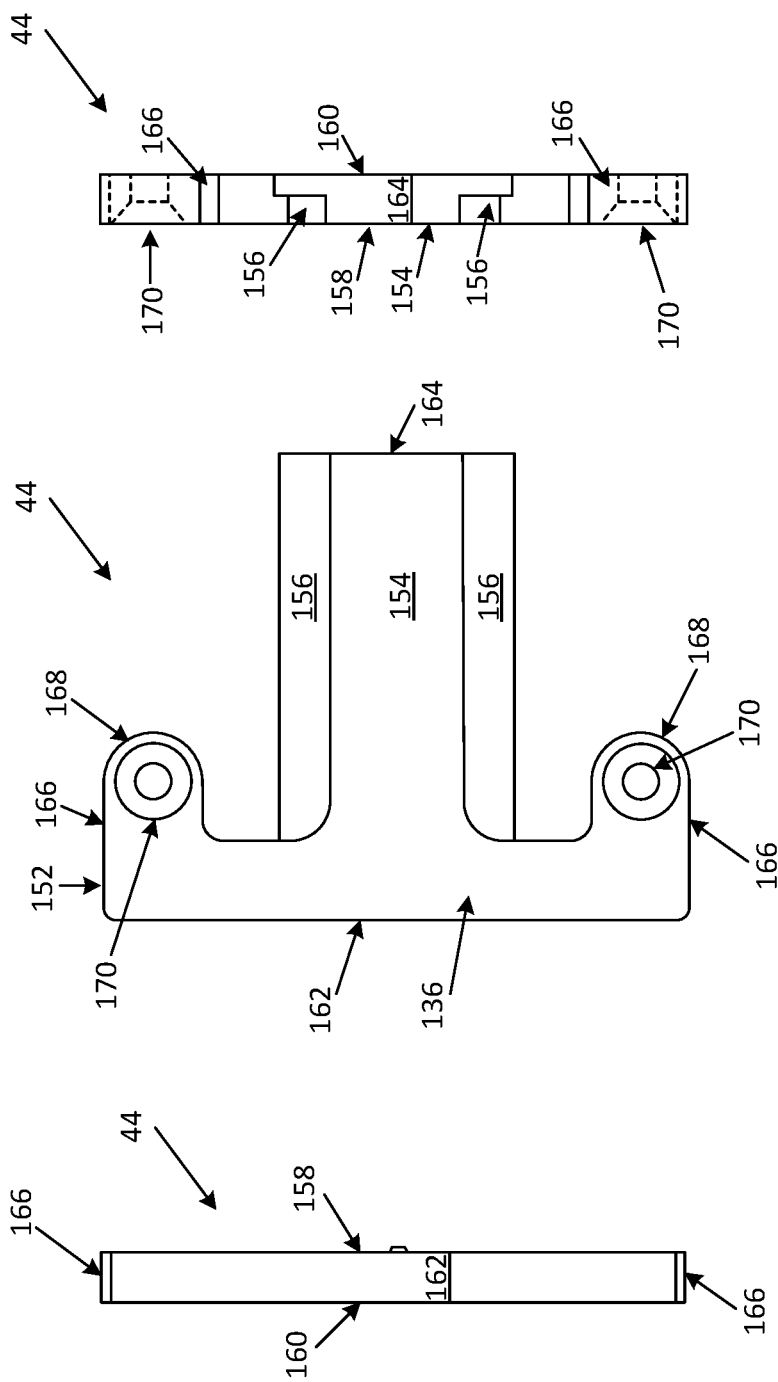

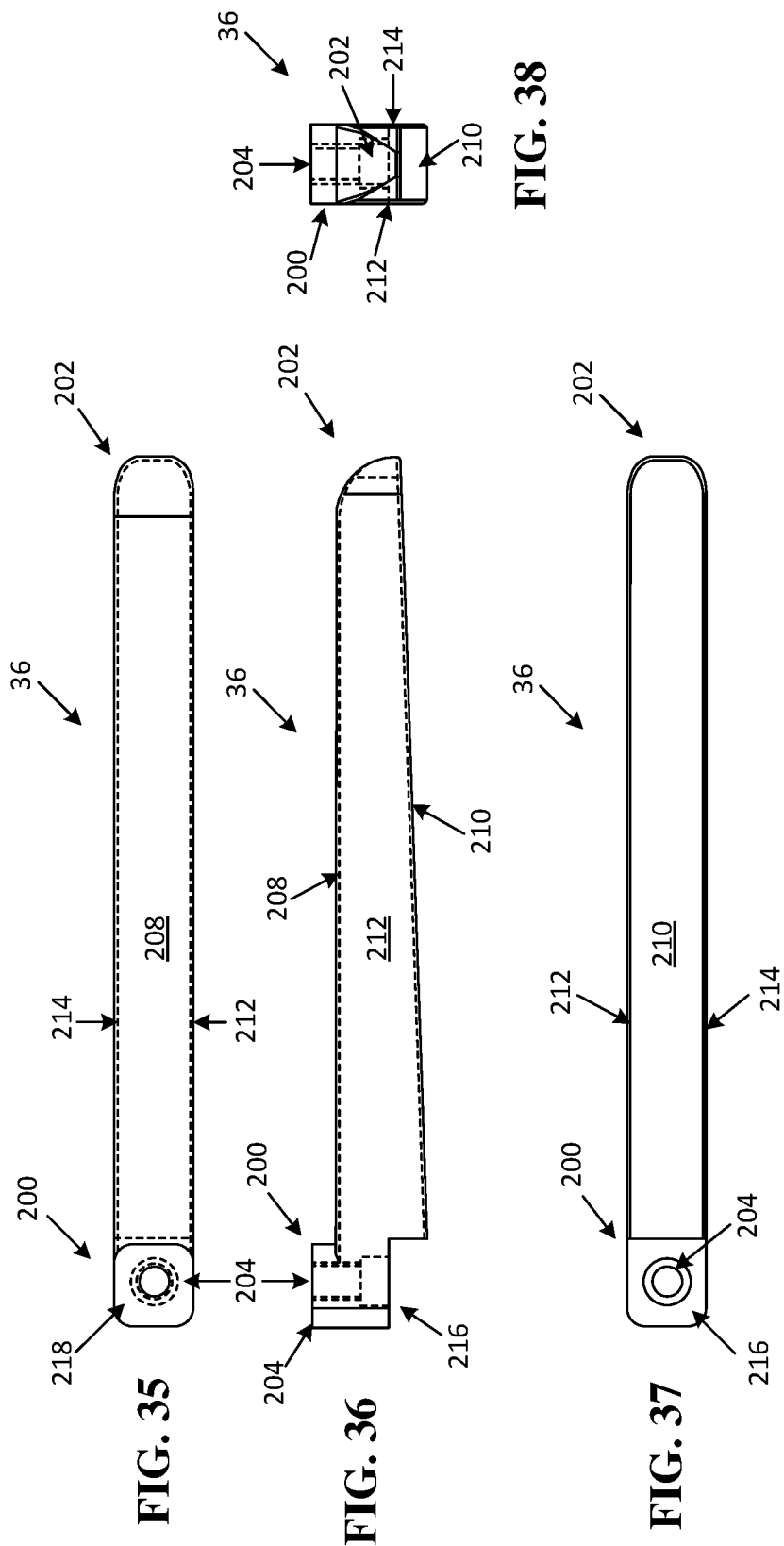

HINGE ASSEMBLY FOR STRINGED MUSICAL INSTRUMENT

CROSS-REFERENCE TO RELATED APPLICATIONS

The present application is non-provisional patent application claiming benefit under 35 USC Section 119(e) from U.S. Provisional Patent Application Ser. No. 63/129,399 filed Dec. 22, 2020, entitled "Hinge Assembly for Stringed Musical Instrument," the entire content of which is hereby expressly incorporated by reference into this disclosure as if set forth fully herein.

BACKGROUND OF THE INVENTION

I. Field of the Invention

The present invention relates generally to a hinge assembly for rotatably connecting two structures together and, more particularly, to a hinge assembly having reinforced abutments for withstanding repeated use over time without unwanted deformation of the underlying hinge components.

II. Discussion of the Prior Art

Stringed instruments, such as guitars, have enjoyed among the highest popularity among musical instruments. Most stringed instruments have a solid neck rigidly coupled to either a hollow or solid body. This construction, while aiding in predictable tuning and quality of play, render many stringed instruments cumbersome for travel (e.g. air, train, auto, etc . . . ), particularly given the additional bulk of the associated case (hard or soft). While various stringed instruments have been attempted to make it easier and/or more convenient to travel with or store these stringed instruments, most are simply smaller or scaled down versions of their traditional counterparts, which still present challenges for travel and/or predictable tuning and quality of play. The present invention is directed at overcoming, or at least improving upon, the disadvantages of the prior art.

SUMMARY OF THE INVENTION

The present invention accomplishes this goal by providing a stringed musical instrument having an improved hinge assembly for folding and unfolding the neck. The hinge assembly includes a 3-part hinge and a locking assembly for locking and unlocking the 3-part hinge. The 3-part hinge includes a base, a middle link, and an upper link. The middle link is rotatably coupled to both the base and upper link such that the overall hinge structure may be selective straightened (so the instrument can be played) or articulated approximately 180 degrees (so the neck may be folded for convenient storage or transportation). The locking assembly includes an elongated locking strut coupled to an actuation system. The actuation system enables a user to selectively translate or otherwise longitudinally move the locking strut relative to the 3-part hinge. When the actuator is in a first state (for locking the hinge), the locking strut is advanced towards the 3-part hinge while in a straightened configuration such that the locking strut is positioned within each of the base, middle link, and upper link to thereby lock or otherwise immobilize the 3-part hinge. When the actuator is in a second state (for unlocking the hinge), the mounting block is moved away from the 3-part hinge to remove the locking strut from at least the upper link and middle link, which thereby permits the middle link to rotate relative to the base and upper link such that the neck may be folded for instrument storage or transportation.

The 3-part hinge may be optionally equipped with features to augment the structural integrity of the articulating surfaces and/or the contact regions within each of the two (2) joints defined by the articulation between the base and middle link (Joint 1) and between the middle link and the upper link (Joint 2). For example, the 3-part hinge may include one or more strike plates that bolster the structural integrity of contact regions along upper portions of the base, middle link, and upper link during the straightened hinge state. Each strike plate includes an abutment surface, one or more load transfer surfaces, a lower surface, an upper surface, and one or more retaining side surfaces (non-load transferring). The strike plates are secured within corresponding recesses formed along upper regions of the base, middle link, and upper link of the 3-part hinge.

In one aspect, one or more of the strike plates may be adjustable to assist in the set-up and maintenance of the 3-part hinge over time. By way of example only, the strike plates in the base and upper link may be static, meaning each is mounted in a fixed position, while one or both of the strike plate of the middle link may be selectively adjustable. In this manner, Joint 1 and/or Joint 2 of the 3-part hinge may be adjusted to be more or less open depending upon the position of the respective adjustable strike plate in the middle link. This is advantageous for optimizing the ability of the elongated locking strut to be moved relative to the 3-part hinge, as well as the ability to use a Plek machine on the fingerboard of the neck for ensuring desired action and playability of the stringed instrument.

In one aspect, one or both of the strike plates in the middle link are equipped with a four (4) generally cylindrical apertures. Two are threaded apertures are dimensioned to receive a threaded adjustment set screw for adjusting the position of the middle link strike plate relative to an adjacent strike plate forming (e.g. base strike plate to collectively form Joint 1 or upper link strike plate to collectively form Joint 2). Two are threaded apertures are dimensioned to receive a threaded locking screw for mounting the middle strike plate to the middle link after it has been adjusted via the threaded adjustment set screws. Each threaded locking screw must be loosened (e.g. rotated counter-clockwise) before the threaded set screws may be advanced in or out of the threaded aperture to selectively adjust the position of the middle strike plate. Once adjusted, each threaded locking screw must be tightened (e.g. rotated clock-wise) to immobilize the middle strike plate in the new position.

Whether adjustable or static, each strike plate includes a flanged central section extending generally perpendicularly from the approximate midpoint of an elongated section that spans a distance that is just short of the entire width of the respective base, middle link and upper link of the 3-part hinge. The length of each flanged central section varies depending upon whether the strike plate is positioned within the base, middle link and upper link, as dictated by the respective lengths of the base, middle link and upper link. The flanged central section includes a pair of flanges extending from a central strut, wherein the flanges have a shorter height than the central strut. The flanges are dimensioned to be received within strike plate undercuts formed in the base, middle link, and upper link of the 3-part hinge. In each instance, the central strut is dimensioned to be received within an upper gap forming part of strike plate recesses in the base, middle link, and upper link. The lower surface of the central strut serves to close off the upper section of the locking strut channel, essentially forming an upper boundary of the locking strut channel so as to form a perimeter within which the elongated locking strut may be positioned to lock and immobilize the 3-part hinge or from which the elongated locking strut may be removed from the middle link and upper link to unlock the 3-part hinge.

The hinge assembly may be constructed from any number of suitable materials, including but not limited to metal (e.g. aluminum), carbon-fiber, plastic, etc. . . . manufactured via any suitable techniques, including but not limited to machining, molding, 3D printing, etc. . . . . . The strike plates are preferably made of a highly robust and durable material relative to the material of the hinge base, middle hinge, and upper hinge, such that the strike plates will not deform or otherwise get negatively impacted from repeated contact during the folding and unfolding over the lifetime of the hinge assembly. By way of example only, the strike plates may be constructed from tool-grade steel heat treated to achieve hardness RC, although it will be appreciated that any number of suitable materials and/or hardness and/or durometers may be employed without departing from the present invention.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein:

FIGS. 1-3 are perspective, side, and back views of a foldable fretted instrument including an adjustable, lockable hinge assembly according to aspects of the present invention;

FIGS. 6-8 are top, side and front views of the hinge assembly of FIGS. 4-5 according to aspects of the present invention;

FIGS. 9-11 are top, lengthwise cross-sectional, and width cross-sectional views of the hinge assembly of FIGS. 4-5 according to aspects of the present invention;

FIGS. 26-29 are various views of a lower static strike plate forming part of the hinge assembly of FIGS. 4-5 for use in the hinge base of FIGS. 12-14 according to aspects of the present invention;

FIGS. 34-38 are various views of the elongated locking strut forming part of the hinge assembly of FIGS. 4-5 for selectively locking and unlocking the 3-part hinge according to aspects of the present invention.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The hinge assembly disclosed herein boasts a variety of inventive features and components that warrant patent protection, both individually and in combination.

Figure 1:
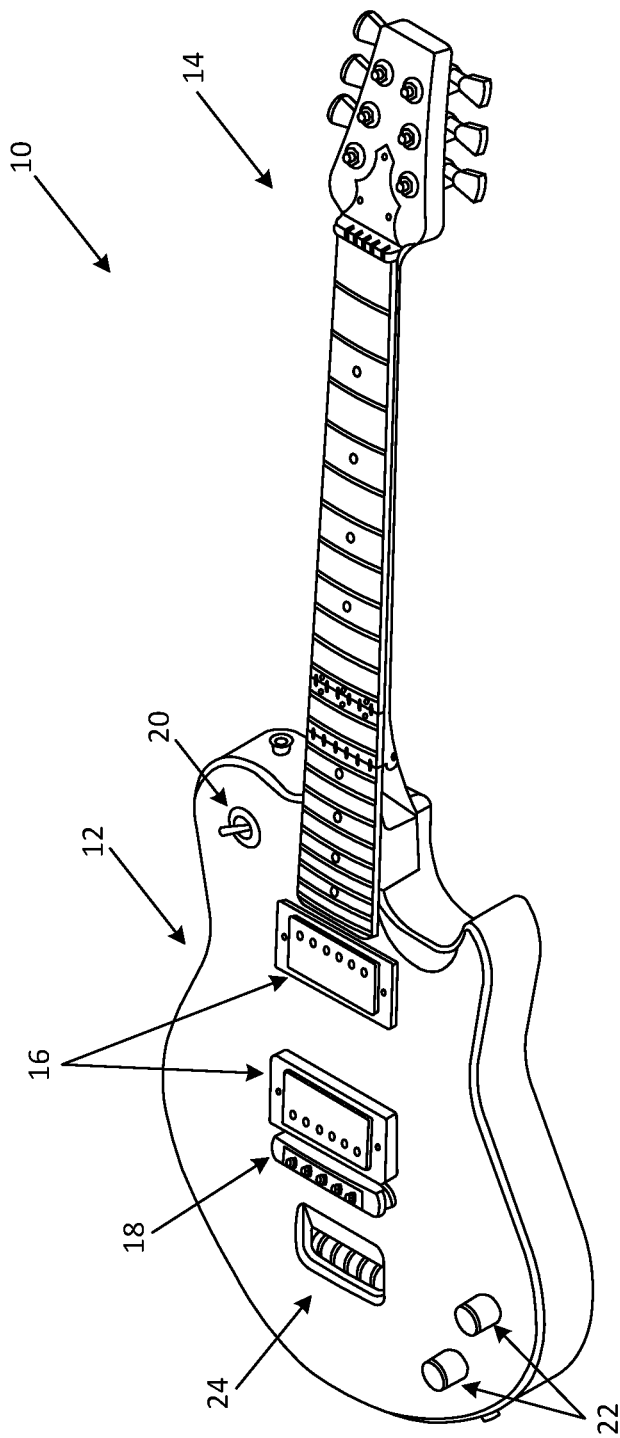

FIGS. 1-3 show a foldable fretted instrument 10 of the present invention having a body 12 and a neck 14 extending therefrom. Although shown as an electric guitar, it will be appreciated that aspects of the foldable fretted instrument 10 described herein may be used in any of a variety of other fretted instruments, including but not limited to acoustic guitars, ukuleles, banjos, bass guitars, etc. The body 12 includes a host of standard components, such as (but not limited to) pick-ups 16, a roller bridge 18, a pick-up selector switch 20, and tone and volume controls 22. The body 12 also includes a string aperture 24, through which strings pass from an actuator 26 disposed in a back recess o 46f the body 12 (FIG. 3). The actuator 26 can be operated to selectively tighten and loosen the strings on the guitar 10, as well as lock and unlock a mid-neck hinge assembly 34 forming part of the neck 14, as will be described below. The back of the body 12 also includes an electronic cover 28 and a switch cover 30. The neck 14 is coupled to the body 12 via a neck plate 32 secured with multiple bolts that threadedly engage the mid-neck hinge assembly 34. With the operation of the actuator 26, along with the mid-neck hinge assembly 34, the guitar 10 is capable of folding in half for convenient transportation and/or storage. When a user wants to play again, the neck can be straightened out before operating the actuator 26 to tighten the strings and lock the neck 14 so the guitar 10 may be tuned at played.

FIGS. 4-11 show the mid-neck hinge assembly 34, along with an elongated locking strut 36 dimensioned to be translated or moved longitudinally relative to the mid-neck hinge 34 to thereby lock and unlock the mid-neck hinge assembly 34 according to aspects of the present invention. The hinge assembly 34 includes a base section 38, a middle section 40, and an upper section 42. According to the present invention, the hinge assembly 34 includes reinforced abutments in the form of, by way of example only, strike plates 44, 46, 48 coupled to the respective base section 38, middle section 40 and upper section 42. Strike plates 44, 48 are mounted via a plurality of threaded machine screws 50. Strike plates 46 are mounted via a plurality of threaded lock screws 52. The base section 38 is hingedly coupled to the middle section 40 with a pair of first hinge pins 54 to create a first abutment joint 56 bounded by the strike plates 44, 46. The upper section 42 is hingedly coupled to the middle section 40 with a second pair of hinge pins 58 to create a second abutment joint 60 bounded by the strike plates 46, 48. In so doing, the strike plates 44, 46, 48 serve to bolster the structural integrity of contact regions adjacent the upper, flat surfaces of the hinge base 38, middle hinge 40, and upper hinge 42 during the straightened state shown in FIG. 4. The strike plates 44, 46, 48 thus prevent deformation of the material used to manufacture the hinge base 38, hinge middle 40, and upper hinge 42 that may otherwise occur during use over time.

Strike plates 44 and 48 are so-called "static" strike plates, because each is fixed in position relative to the hinge base 38 and upper link 42, respectively, via the screws 50. Strike plates 46, however, are so-called "dynamic" strike plates because each is configured to be adjustable relative to the middle link 40. This adjustability feature assists in the set-up and maintenance of the hinge assembly 34 over time. In this manner, first abutment joint 56 and/or second abutment joint 60 of the hinge assembly 34 may be adjusted to be more or less open depending upon the position of the respective adjustable strike plates 46 in the middle link 40. This is advantageous for optimizing the ability of the elongated locking strut 36 to be moved relative to the hinge assembly 34, as well as the ability to use a Plek machine on the fingerboard of the neck 14 for ensuring desired action and playability of the stringed instrument 10.

Figure 4:
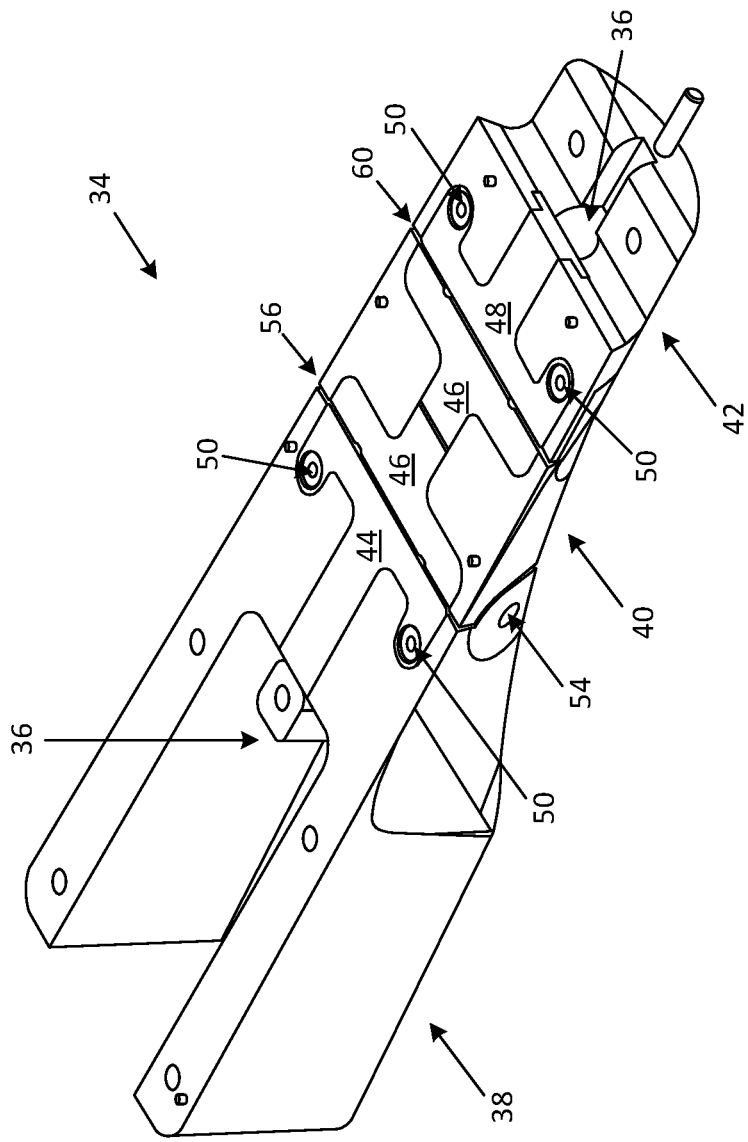
FIGS. 4-5 are perspective views (assembled and exploded) of an adjustable, lockable hinge assembly according to aspects of the present invention.

In one aspect, the adjustability feature is accomplished by equipping one or both of the strike plates 46 in the middle link 40 with a plurality of generally cylindrical threaded apertures, which (by way of example only) may comprise two (2) medial threaded apertures 62 each dimensioned to receive a threaded locking screw 52 and two (2) lateral threaded apertures 64 each dimensioned to receive a threaded adjustment set screw 66. Each threaded locking screw 52 must be loosened (e.g. rotated counter-clockwise) before the threaded adjustment set screws 66 may be advanced in or out of the threaded aperture of the strike plate 20 to selectively adjust the position of either middle strike plate 46 relative to an adjacent strike plate 44, 48. For example, the proximal strike plate 46 may be adjusted relative to base strike plate 44 to collectively form first abutment joint 56 and/or the distal strike plate 46 may be adjusted relative to the upper strike plate 48 to collectively form second abutment joint 60 as best shown in FIG. 4. Once the adjustment set screws 66 are adjusted to bring either strike plate 46 into the desired position, then each locking screw 52 may be rotated clockwise to lock the position of the middle strike plate 46 relative to the middle link 40.

The strike plates 44, 46, 48 serve another important purpose, namely, forming part of the enclosure for the elongated locking strut 36 when introduced fully into the hinge assembly 34 according to an aspect of the present invention. More specifically, the hinge base 38, middle link 40, and upper link 42 each include a channel 68, 70, 72, respectively, dimensioned to receive the elongated locking strut 36. As will be described in detail below, each channel 68, 70, 72 includes a lower surface and side surfaces which cooperate with corresponding surfaces of the elongated locking strut 36. The strike plates 44, 46, 48 each include a lower surface which cooperates with the upper surface of the elongated locking strut 36. Collectively, the channels 68, 70, 72 and strike plates 44, 46, 48 allow the elongated locking strut 36 to: (a) be smoothly introduced into the base 38, middle, link 40, and upper link 42 when aligned into a straightened configuration; (b) immobilize the base 38, middle link 40, and upper link 42 in the straightened configuration; and (c) be smoothly removed from the middle link 40 and upper link 42 in order to allow the hinge assembly 34 to be articulated approximately 180 degrees into a folded configuration.

Figure 12:
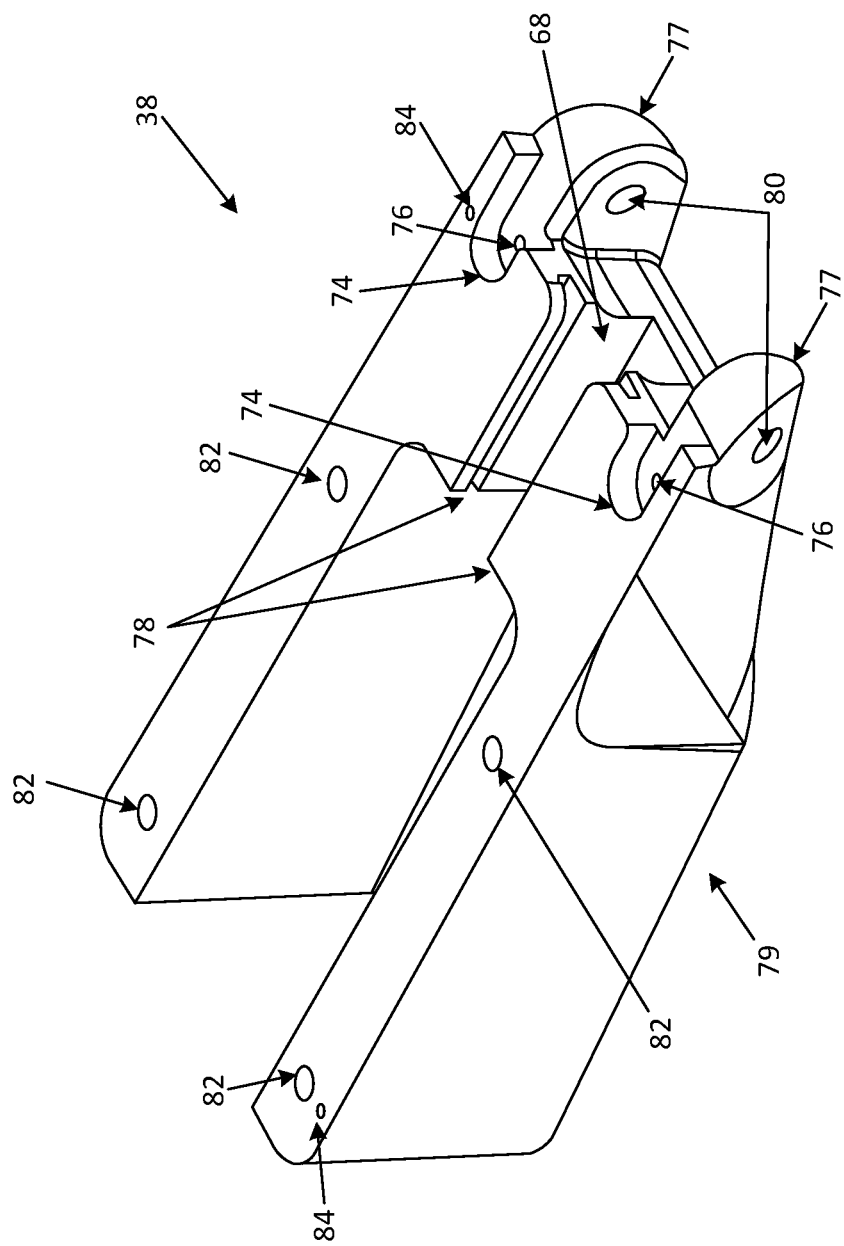
FIGS. 12-14 are various views of a hinge base forming part of the hinge assembly of FIGS. 4-5 according to aspects of the present invention.
Figure 13:
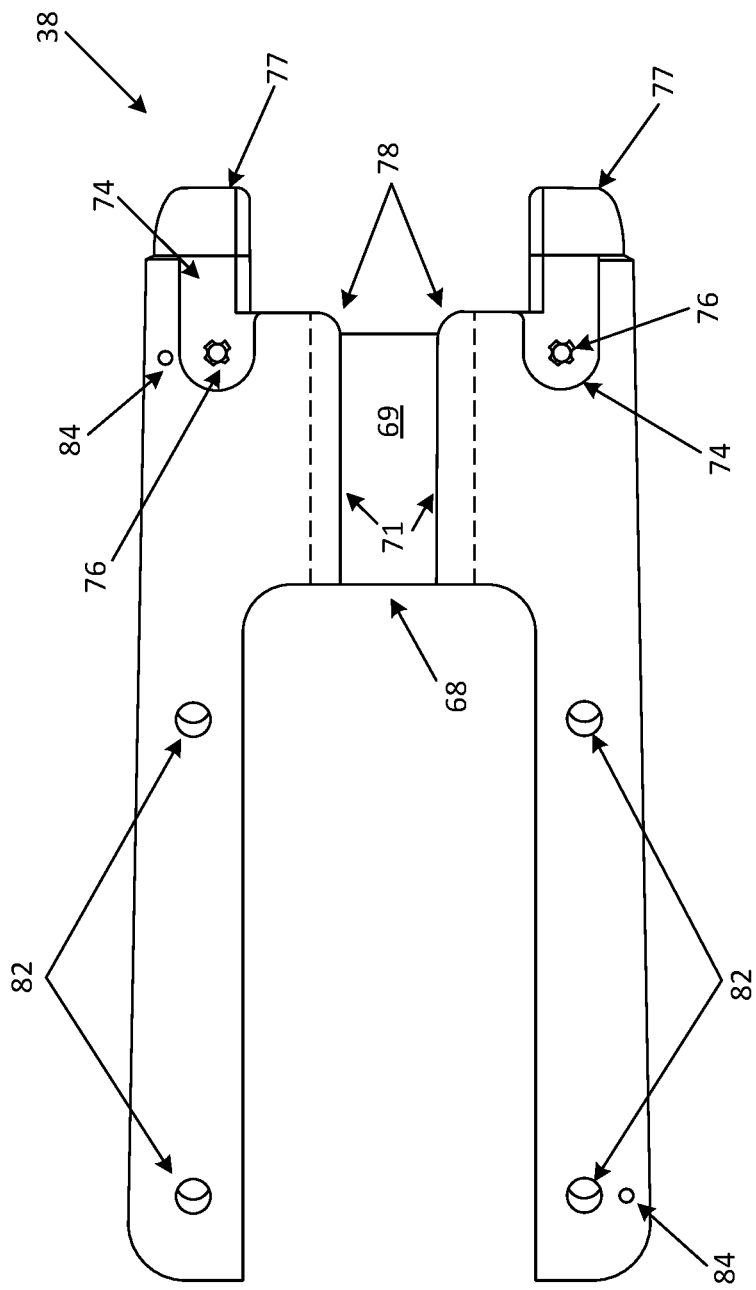
Figure 14:
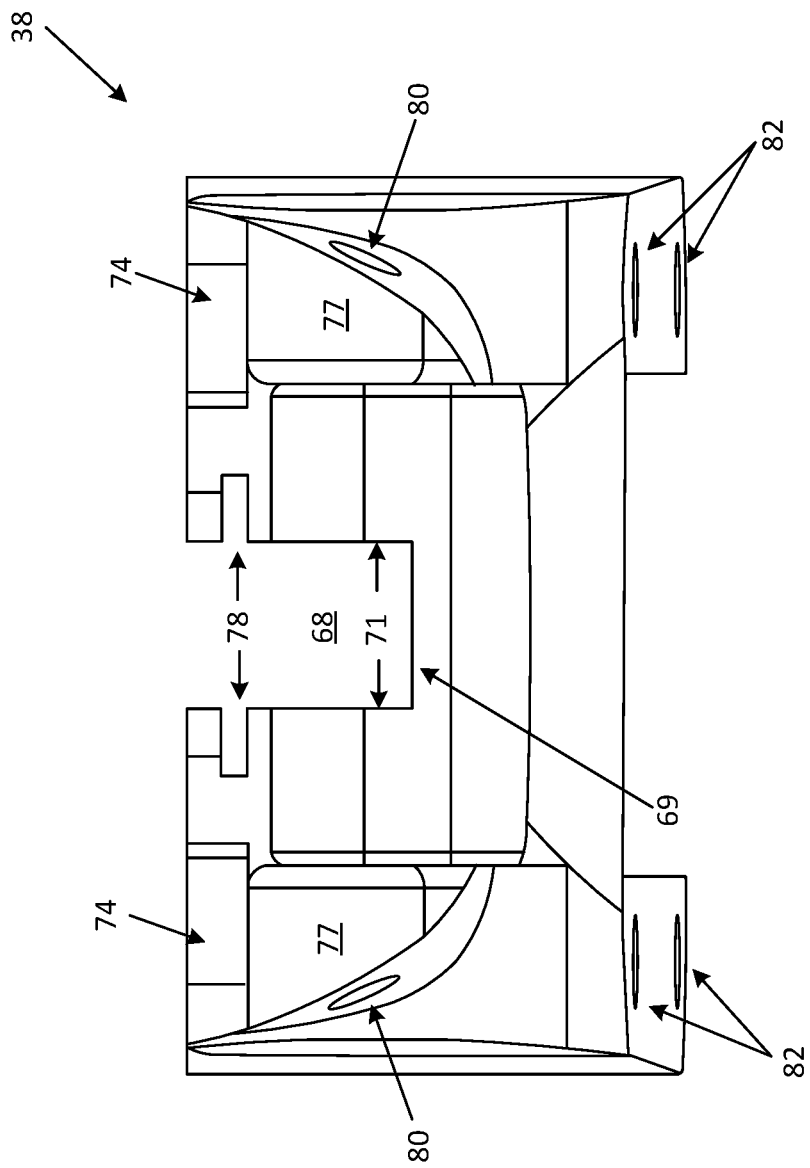

FIGS. 12-14 detail the construction of the base section 38 according to aspects of the present invention. The base section 38 includes a pair of recess 74, each having a threaded aperture 76, along with undercuts 78 on either side of the strut channel 68 towards the upper surface of the base 38. These features collectively enable the base 38 to slidably receive and then rigidly mount the strike plate 44, which will be described in detail below with reference to FIGS. 26-29. The undercuts 78 are dimensioned to slidably receive lateral flanges of the strike plate 44, while recesses 74 are dimensioned to receive lobed sections of the strike plate 44. Once positioned with the lobes of the strike plate 44 in the recesses 74, the locking screws 50 may then be threadably engaged into the threaded apertures 76 to thereby rigidly affix the strike plate 44 relative to the base section 38.

When so mounted, the lower surface of the strike plate 44 forms an effective "ceiling" for the channel 68 to thereby prevent any upward movement of the elongated locking strut 36 when disposed withing the locking strut channel 68. The locking strut channel 68 includes side walls 69 and a lower surface 71 which, along with the lower surface of the strike plate 44, define a perimeter within which the locking strut 36 may be wedged into a secure engagement once advanced into the hinge assembly 34 as best shown in FIG. 10.

The base section 38 of hinge assembly 34 also includes a variety of threaded apertures to facilitate assembly as part of the neck 14 and also to couple the neck 14 to the body 12 as shown in FIGS. 1-3. More specifically, the base section 38 includes a pair of knuckles 77 extending generally perpendicularly away from a main section 79 of the base 38. Each knuckle 77 is equipped with a hinge pin bore 80 dimensioned to receive connecting pins 54 for the purpose of hingedly coupling the base section 38 to the middle section 40, as will be described below. The base section 38 also includes threaded mounting bores 82 dimensioned to receive threaded machine screws for the purpose of mounting the neck 14 to the body 12 via the neck plate 32 best shown in FIGS. 2-3. A pair of location pin recesses 84 are formed in diametrically opposed areas on the upper surface of the base section 38, which are dimensioned to receive locator pins (not shown) to aid in the process of positioning the fingerboard of the neck 14 during assembly.

Figure 15:
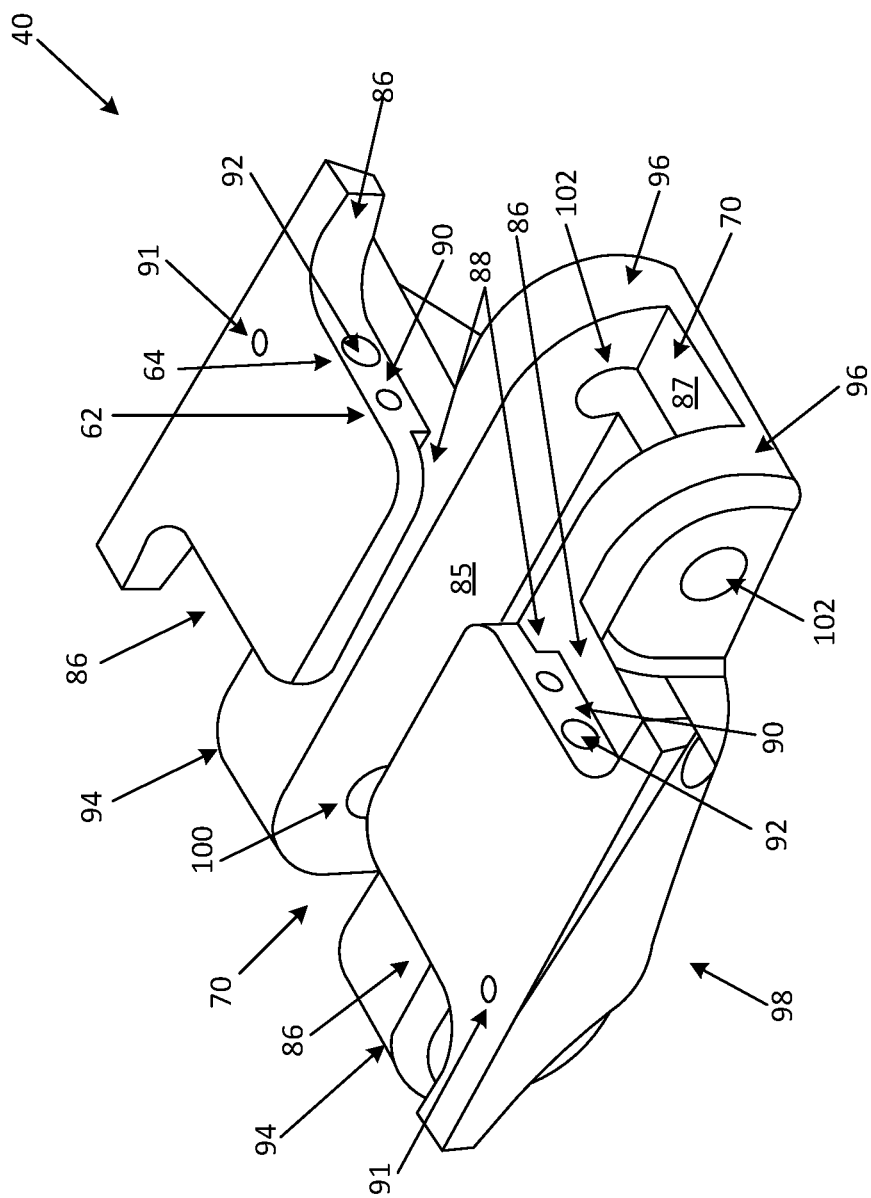
FIGS. 15-17 are various views of a middle hinge member forming part of the hinge assembly of FIGS. 4-5 according to aspects of the present invention.
Figure 16:
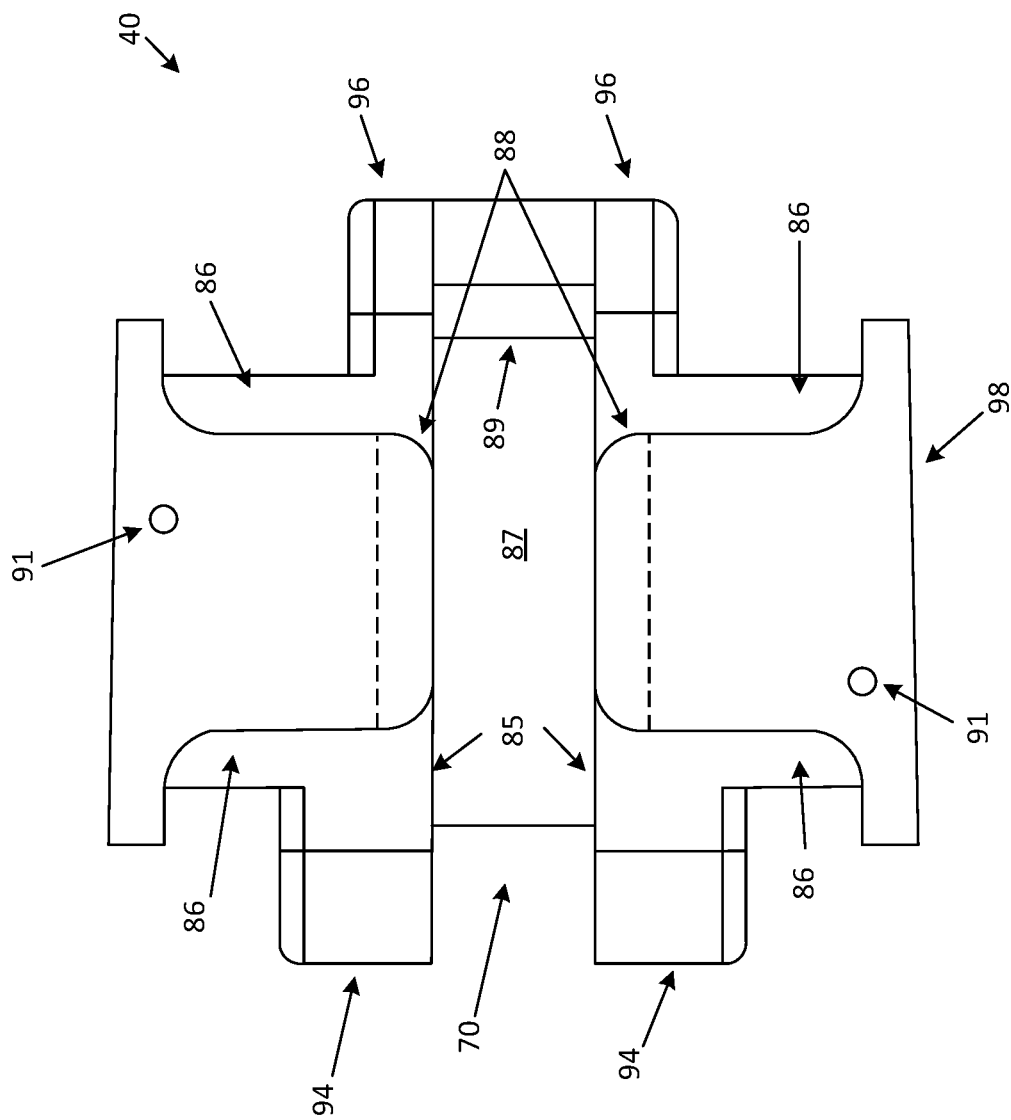
Figure 17:
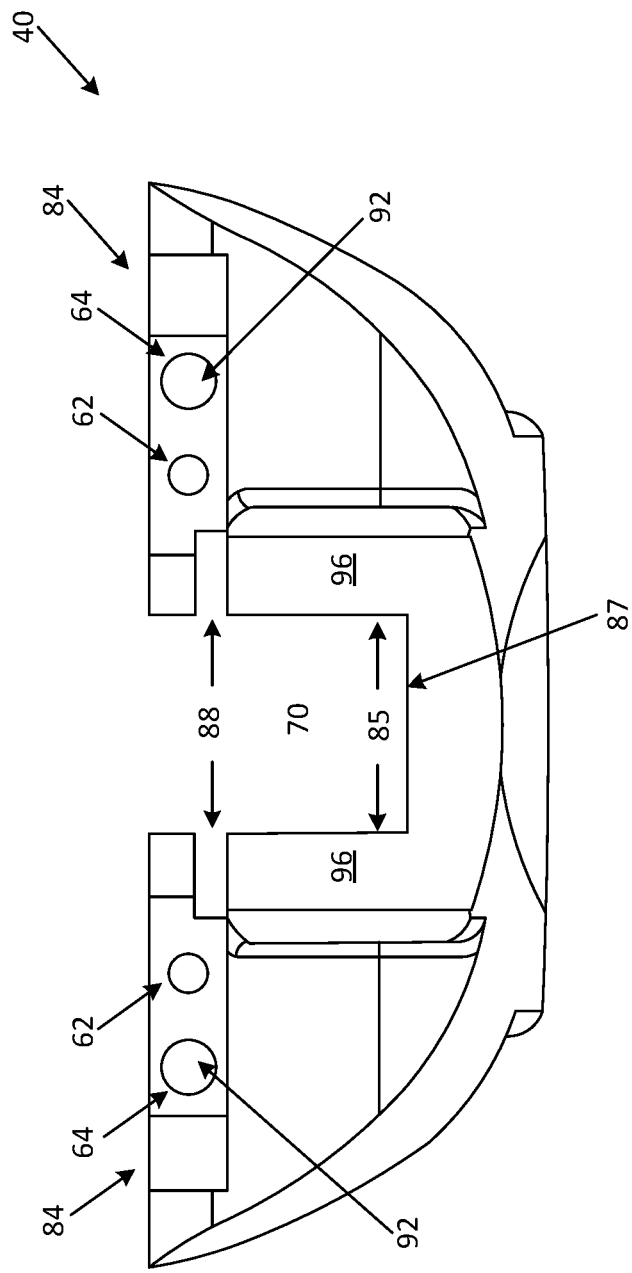
Figure 18:
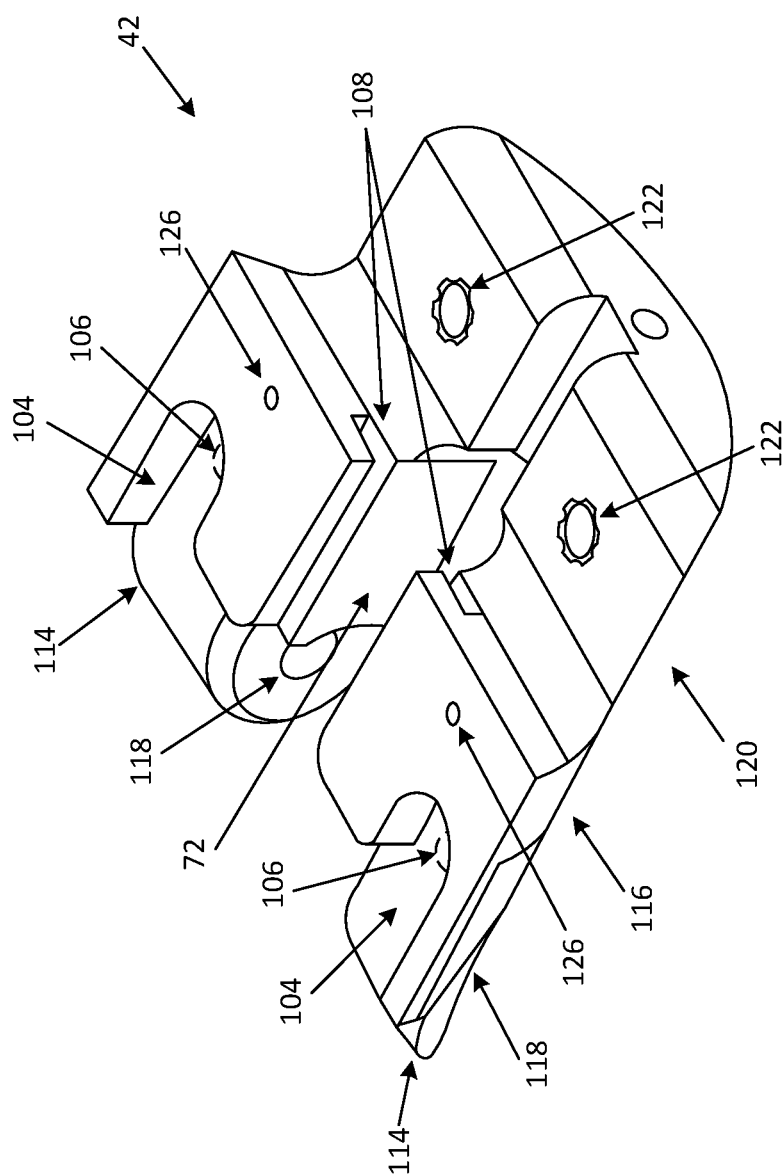
FIGS. 18-21 are various views of an upper hinge member forming part of the hinge assembly of FIGS. 4-5 according to aspects of the present invention.
Figure 19:
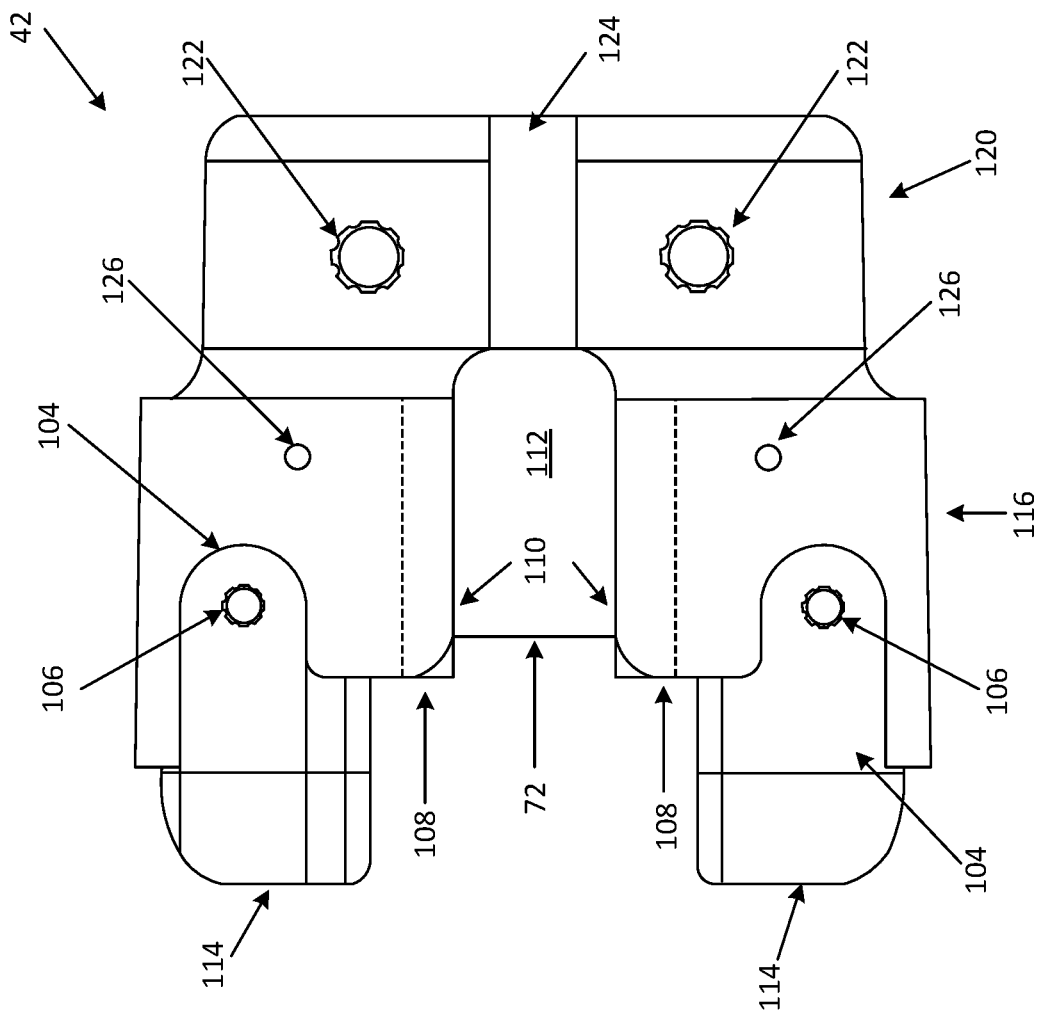
Figure 20:
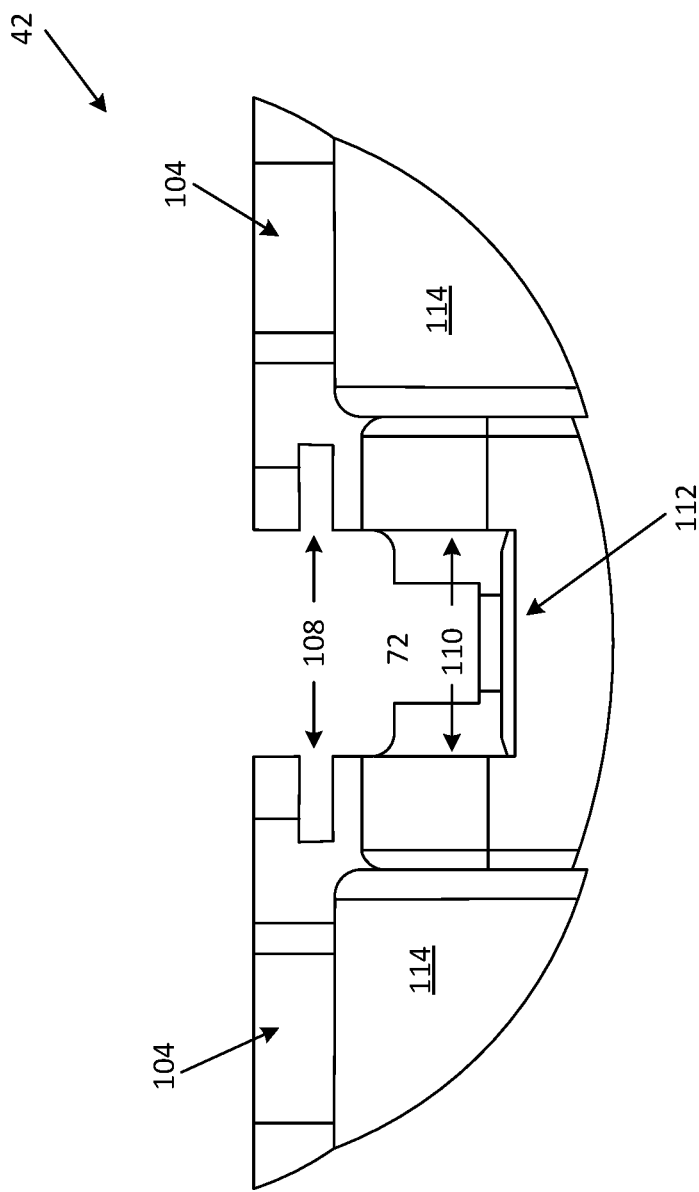
Figure 21:
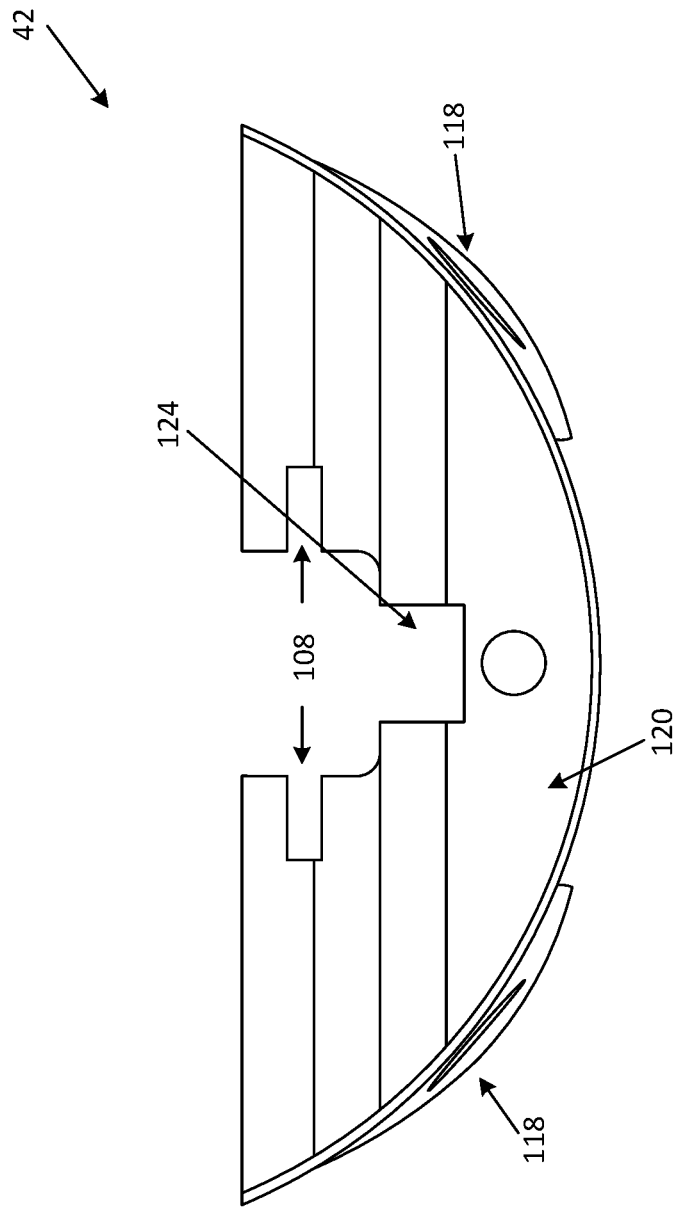
Figure 22:
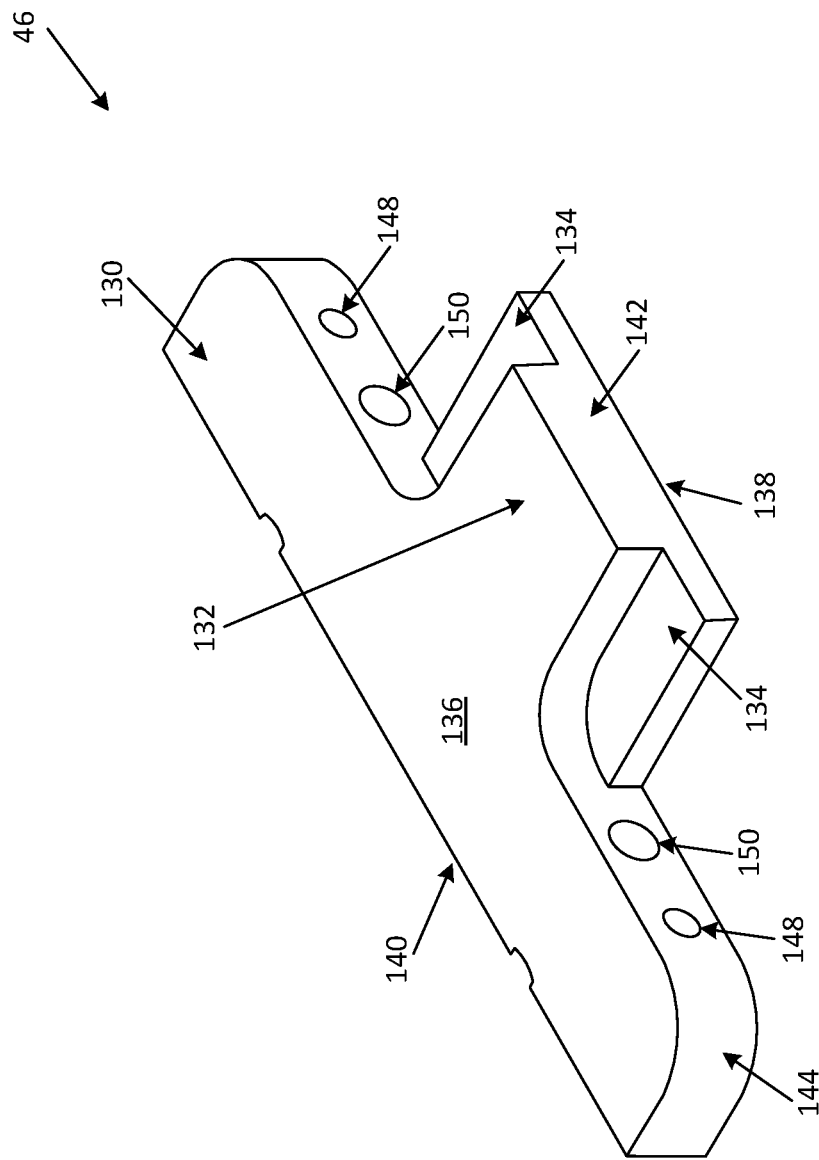
FIGS. 22-25 are various views of an adjustable strike plate forming part of the hinge assembly of FIGS. 4-5 (for use in the middle hinge member of FIGS. 15-17) according to aspects of the present invention.
Figure 25:
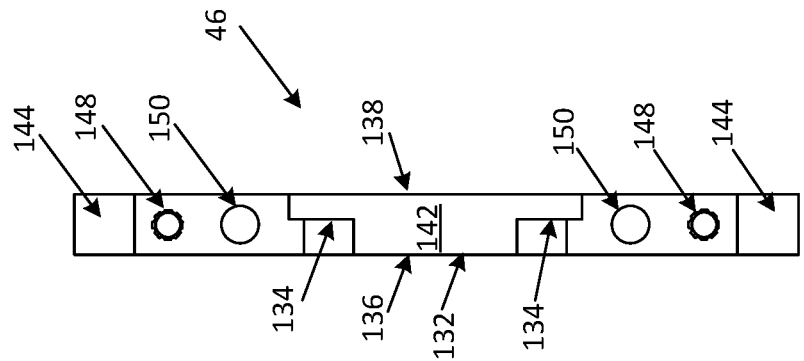
Figure 23:
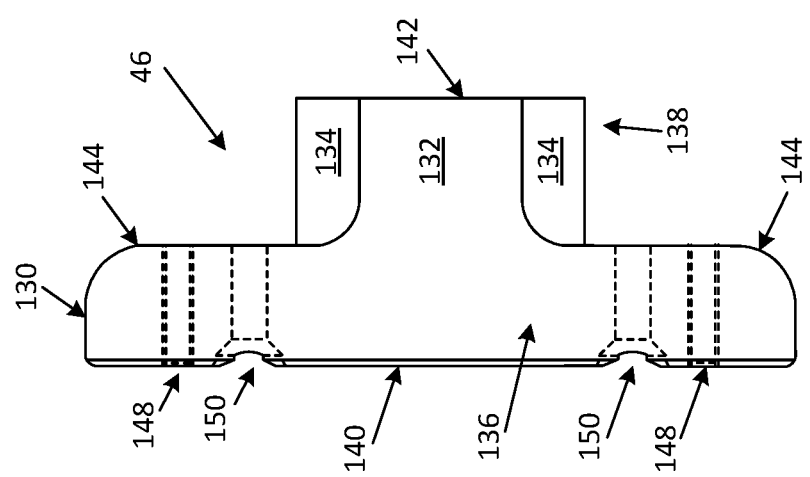
Figure 24:
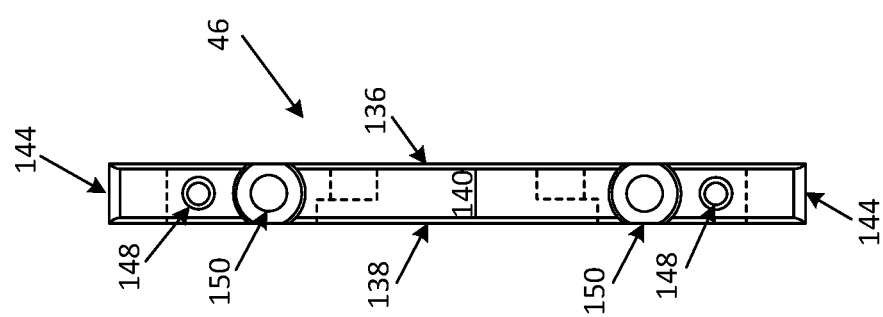
Figure 26:
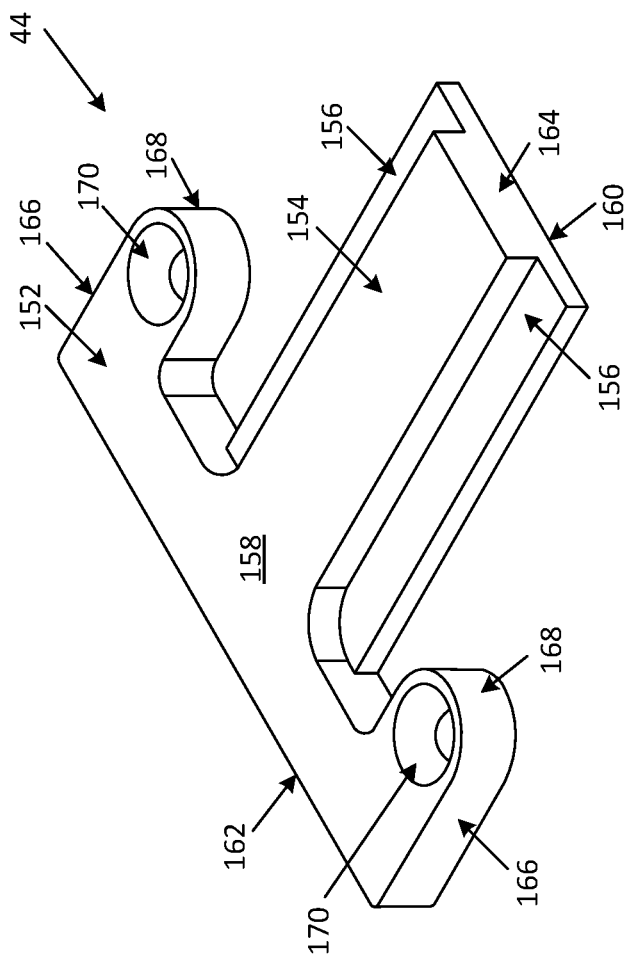
Figure 30:
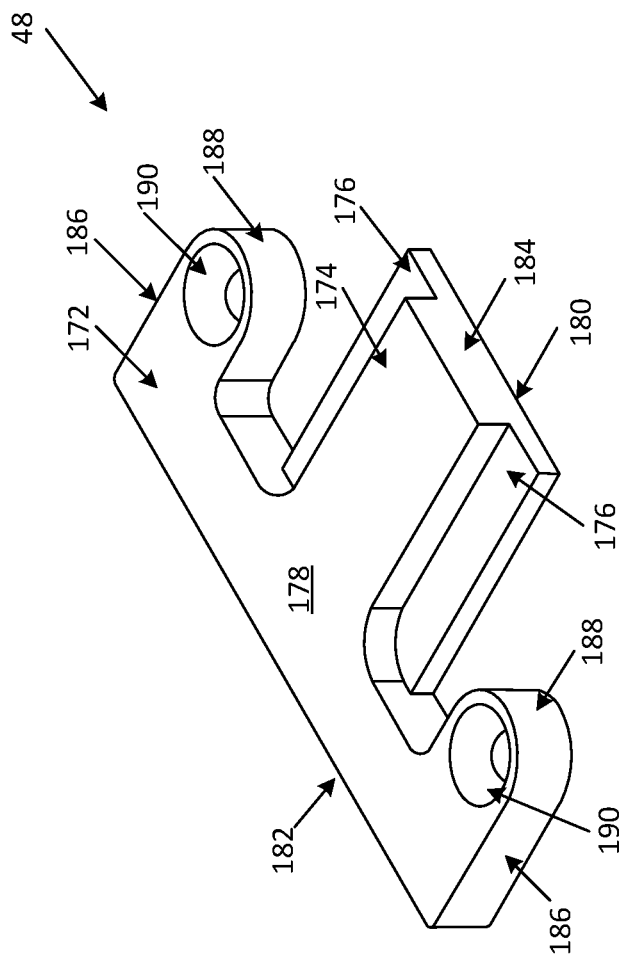
FIGS. 30-33 are various views of a second static strike plate forming part of the hinge assembly of FIGS. 4-5 for use in the upper hinge of FIGS. 18-21 according to aspects of the present invention.
Figure 33:
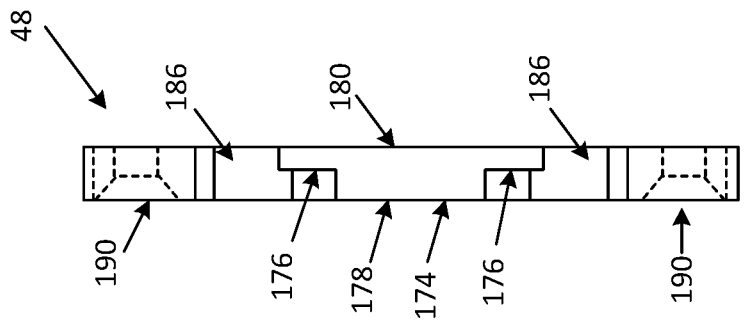
Figure 31:
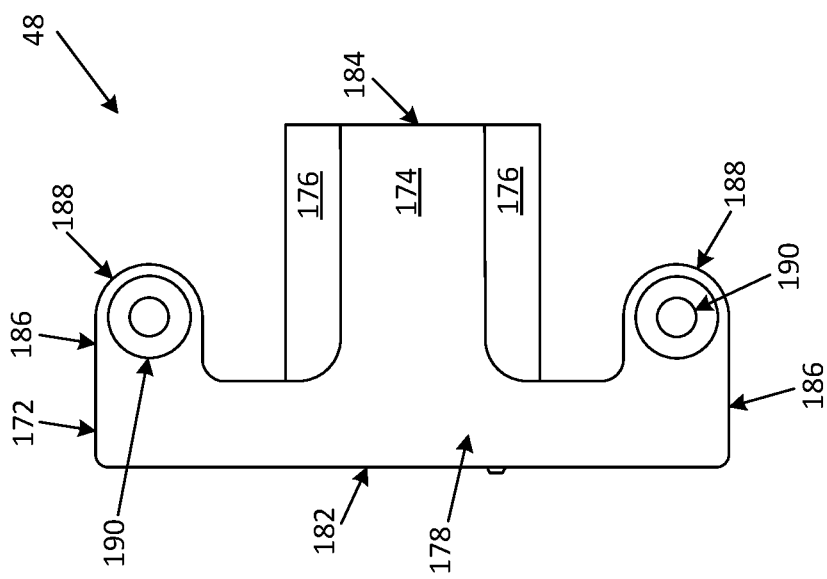
Figure 32:
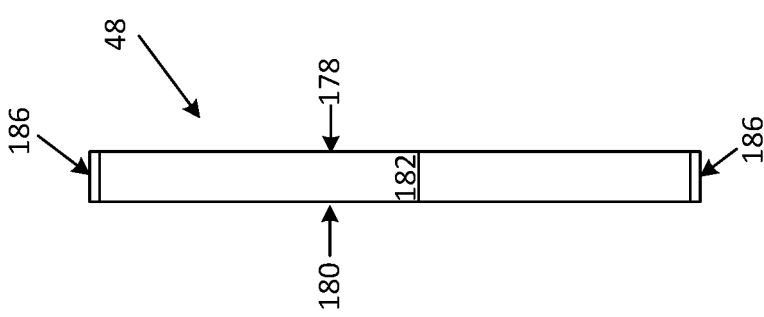
Figure 34:
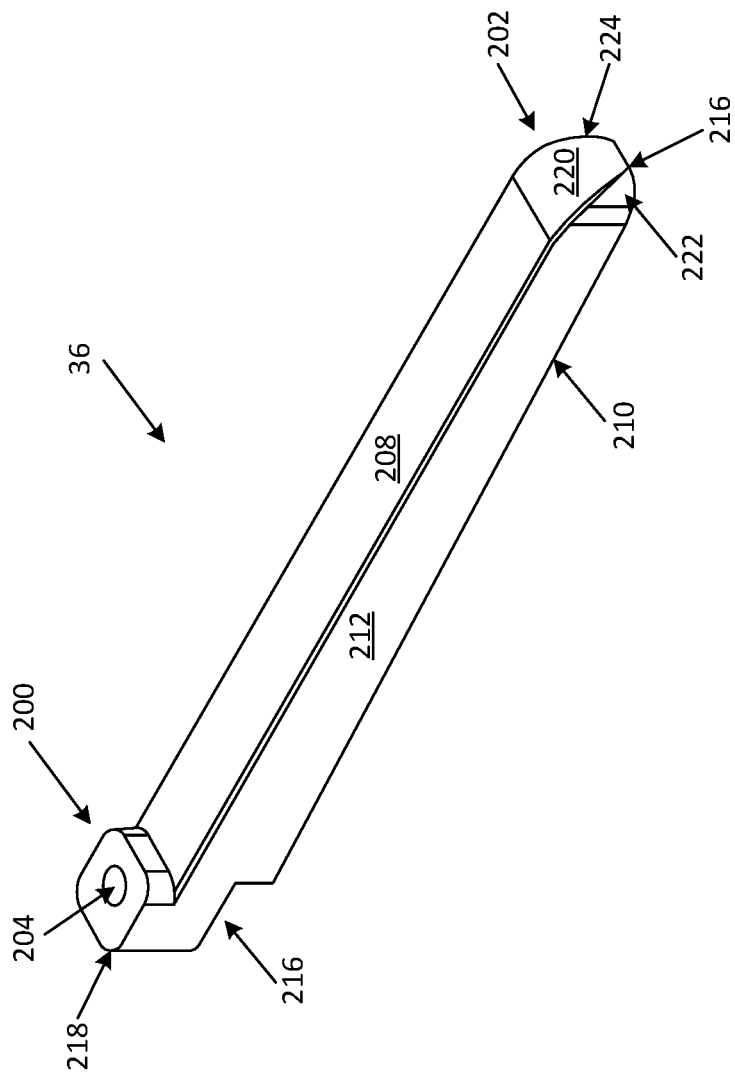

FIGS. 15-17 detail the construction of the middle link 40 according to aspects of the present invention. The middle link 40 includes a plurality of recesses 86 and undercuts 88 which collectively enable the middle link 40 to slidably receive and then rigidly mount the strike plate 46. More specifically, the undercuts 88 are dimensioned to slidably receive lateral flanges of the strike plate 46, while recesses 86 are dimensioned to receive lobed sections of the strike plate 46, as will be described in detail below with reference to FIGS. 22-25. When so mounted, the lower surface of the strike plates 46 form an effective "ceiling" for the channel 70 to thereby prevent any upward movement of the elongated locking strut 36 when disposed withing the locking strut channel 70. The locking strut channel 70 includes side walls 85 and a lower surface 87 which, along with the lower surface of the strike plates 46, define a perimeter within which the locking strut 36 may be wedged into a secure engagement once advanced into the hinge assembly 34 as best shown in FIG. 10.

Each strike plate recess 86 is equipped with a plurality of generally cylindrical apertures extending through a front surface 90, including a pair of threaded bores 62 and a pair of smooth bores 64. Each threaded bore 62 is dimensioned to receive a threaded locking screw 52 (FIG. 5) for locking the position of the middle strike plate 46 after it has been adjusted via the threaded set screws 66. Each smooth bore 64 is dimensioned to receive an elongated rod 92 that serves as a contact point for a threaded set screw 66 (FIG. 5) that extend through a threaded bore of the strike plate 46 when adjusting the location of the strike plate 46. To adjust the location of either strike plate 46 via the threaded set screw 66, each threaded locking screw 52 must first be loosened (e.g. rotated counter-clockwise) so the threaded set screws 66 may be advanced in or out of the respective threaded bore of the strike plate 46 to selectively adjust the position of the middle strike plate 46 relative to the middle link 40. Once adjusted, each threaded locking screw 52 must be tightened (e.g. rotated clock-wise) to immobilize the middle strike plate 46 in the preferred position. As shown in FIG. 4, the abutment surfaces of strike plates 44 and 46 collectively form first abutment joint 56, while the abutment surfaces of strike plates 46 and 48 collectively form second abutment joint 60.

Figure 5:
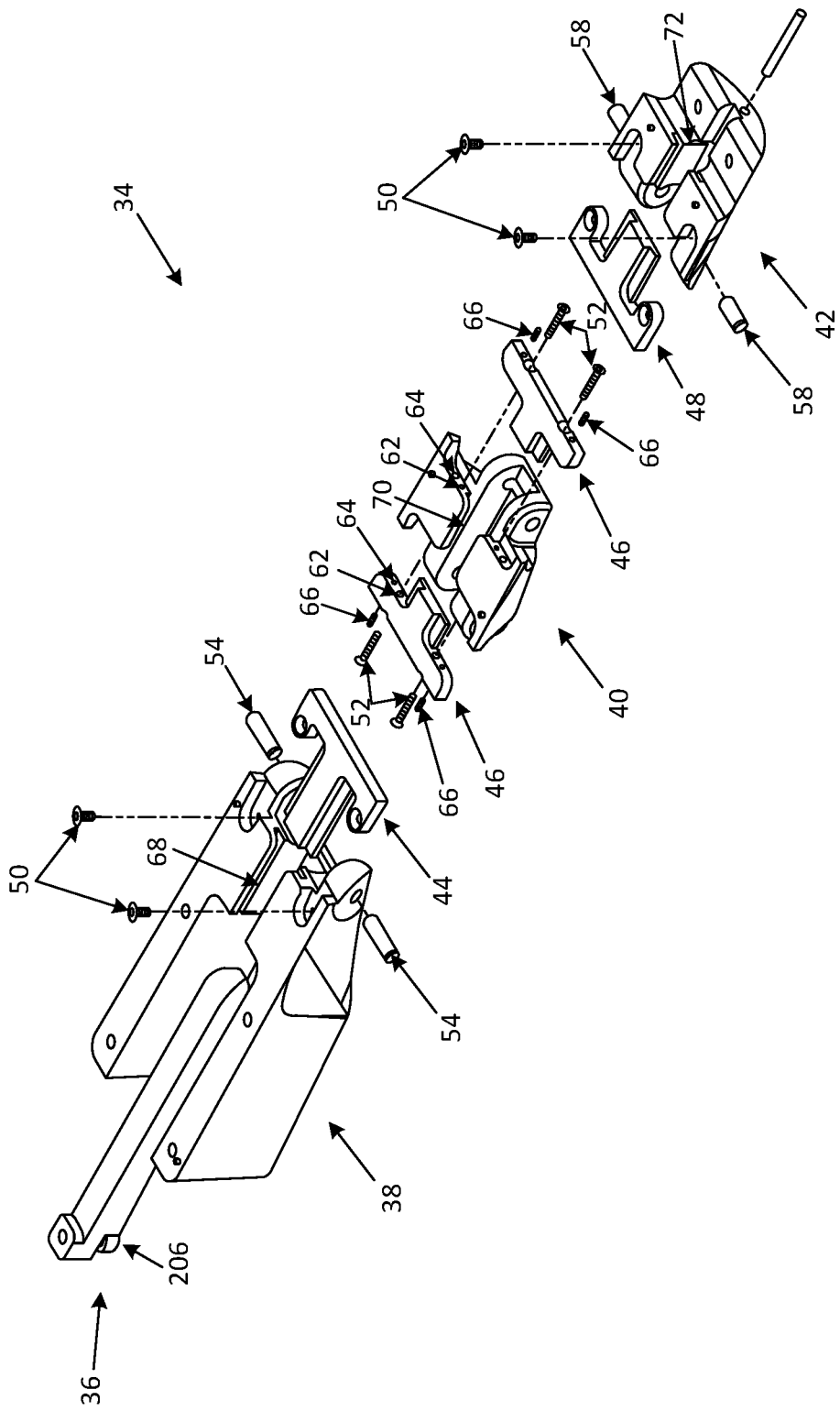

The middle link 40 includes a first pair of knuckles 94 and a second pair of knuckles 96 each extending generally perpendicularly from a central section 98, albeit in opposite directions. Each knuckle 94 includes a hinge pin bore 100 dimensioned to receive a hinge pin 54 (FIG. 5). Each knuckle 96 includes a hinge pin bore 102 dimensioned to receive a hinge pin 58 (FIG. 5). The first pair of knuckles 94 are dimensioned to nest medially inside the knuckles 71 of the base 38 when the base 38 and middle link 40 are brought into engagement during the assembly process. The hinge pin bores 80 of the knuckles 71 of base 38 54 must be brought into coaxial alignment with the bores 100 of the knuckles 94 of the middle link 40. Once positioned in this manner, the hinge pins 54 may be inserted into the co-aligned bores 80, 100 such that the base 38 and middle link 40 are hingedly coupled together. In one embodiment, this hinged coupling allows the base 38 and middle link 40 to rotate a range of 0 degrees to approximately 90 to 95 degrees relative to one another. The second pair of knuckles 96 are dimensioned to engage with corresponding knuckles (not shown) formed on the upper link 42, as will be described below, and hingedly coupled together via hinge pins 58 (FIG. 5) in the same manner as described above with respect to the base 38 and middle link 40. A pair of location pin recesses 91 are formed in diametrically opposed areas on the upper surface of the base section 38, which are dimensioned to receive locator pins (not shown) to aid in the process of positioning the fingerboard of the neck 14 during assembly.

FIGS. 18-21 detail the construction of the upper link 42 according to aspects of the present invention. The upper link 42 includes a pair of recesses 104, each having a threaded aperture 106, along with undercuts 108 on either side of the strut channel 72 towards the upper surface of the upper link 42. These features collectively enable the upper link 42 to slidably receive and then rigidly mount the strike plate 48, which will be described in detail below with reference to FIGS. 30-33. The undercuts 108 are dimensioned to slidably receive lateral flanges of the strike plate 48, while recesses 104 are dimensioned to receive lobed sections of the strike plate 48. Once positioned with the lobes of the strike plate 48 in the recesses 104, the locking screws 50 may then be threadably engaged into the threaded apertures 106 to thereby rigidly affix the strike plate 48 relative to the upper section 42.

When so mounted, the lower surface of the strike plate 48 forms an effective "ceiling" for the channel 72 to thereby prevent any upward movement of the elongated locking strut 36 when disposed withing the locking strut channel 72. The locking strut channel 72 includes side walls 110 and a lower surface 112 which, along with the lower surface of the strike plate 48, define a perimeter within which the locking strut 36 may be wedged into a secure engagement once advanced into the hinge assembly 34 as best shown in FIG. 10.

The upper section 42 of hinge assembly 34 also includes a variety of threaded apertures to facilitate assembly as part of the neck 14. More specifically, the upper link 42 includes a pair of knuckles 114 extending generally perpendicularly away from a main section 116 of the upper link 42. Each knuckle 114 is equipped with a hinge pin bore 118 dimensioned to receive connecting pins 58 for the purpose of hingedly coupling the upper link 42 to the middle section 40, as will be described below. The upper link 42 also a lower mounting section 120 extending generally perpendicularly away from the main section 116. The lower mounting section 120 includes threaded mounting bores 122 dimensioned to receive threaded machine screws for the purpose of mounting the hinge assembly 34 to the material forming the neck 14 (e.g. wood, carbon fiber, aluminum, etc. . . . ) to produce the neck 14 as best shown in FIGS. 2-3. The lower mounting section 120 also includes a generally rectangular recess 124 dimensioned to receive a rectangular end of a truss rod (not shown). A pair of location pin recesses 126 are formed in diametrically opposed areas on the upper surface of the upper link 42, which are dimensioned to receive locator pins (not shown) to aid in the process of positioning the fingerboard of the neck 14 during assembly.

FIGS. 22-25 detail the construction of the adjustable strike plates 46 according to aspects of the present invention. Each adjustable strike plate 46 is generally "T" shaped and is dimensioned to be slidably engaged with the middle link 40 to accomplish two primary goals: (1) forming a "ceiling" for the internal channel 70 to snugly capture the elongated ramped strut 36 when inserted to lock the hinge assembly 34; and 2) forming the first abutment joint 56 or second abutment joint 60 in conjunction with the lower strike plate 44 or upper strike plate 48, respectively, to protect the underlying material of the middle link 40 during operation of the hinge assembly 34. In one embodiment, the strike plates 46 are constructed from stainless steel heat treated to a hardness H-900, while the middle link 40 is constructed from Aluminum (e.g. 7075 or 6061), however, other materials and strengthening techniques may be employed without departing from the scope of the invention.

Each strike plate 46 includes an elongated abutment section 130, a central strut section 132 extending generally perpendicularly from the abutment section 130, and a pair of flange members 134 extending generally laterally from the central strut section 132. The abutment section 130 spans a distance that is just short of the entire width of the middle link 40 of the hinge assembly 34. The adjustable strike plate 46 includes a generally planar upper surface 136, a generally planar lower surface 138, a generally planar abutment surface 140, a generally planar back surface 142, and a curved side surface 144 extending between the abutment surface 140 and the back surface 142.

The lateral flanges 134 have a shorter height than the central strut 132. The flanges 134 are dimensioned to be slidably received within the strike plate undercuts 88 formed in the middle link 40 of the hinge assembly 34. The central strut 132 is dimensioned to be received within an upper gap forming part of strike plate recesses 86 in the middle link 40. The lower surface 138 of the central strut 132 serves to close off the upper section of the locking strut channel 70 of the middle link 40, essentially forming an upper boundary of the locking strut channel 70 so as to form a perimeter within which the elongated locking strut 36 may be positioned to lock and immobilize the hinge assembly 34 or from which the elongated locking strut 36 may be removed (from the middle link 40 and upper link 42) to unlock the hinge assembly 34.

Each strike plate 46 is equipped with a plurality of generally cylindrical apertures, including a pair of threaded bores 148 and a pair of non-threaded bores 150. Each threaded bore 148 is dimensioned to receive a threaded adjustment set screw 66 (FIG. 2) for adjusting the position of the strike plate 46 relative to an adjacent strike plate, either strike plate 44 of base 38 or strike plate 48 of upper link 42. Each non-threaded bore 150 is dimensioned to receive a threaded locking screw 52 (FIG. 2) for mounting the adjustable strike plate 46 to the middle link 40 after the position of the strike plate 46 has been adjusted via the threaded adjustment set screws 66. Each threaded locking screw 52 must be loosened (e.g. rotated counter-clockwise) before the threaded set screws 66 may be advanced in or out of the threaded bore 148 to selectively adjust the position of the middle strike plate 46. Once adjusted, each threaded locking screw 52 must be tightened (e.g. rotated clock-wise) to immobilize the middle strike plate 46 in the new position on the middle link 40.

FIGS. 26-29 detail the construction of the static strike plate 44 according to aspects of the present invention. Each static strike plate 44 is generally "T" shaped and is dimensioned to be slidably engaged with the base 38 to accomplish two primary goals: (1) forming a "ceiling" for the internal channel 68 to snugly capture the elongated ramped strut 36 when inserted to lock the hinge assembly 34; and 2) forming the first abutment joint 56 in conjunction with an adjustable strike plate 46 to protect the underlying material of the base 38 during operation of the hinge assembly 34. In one embodiment, the strike plate 44 is constructed from stainless steel heat treated to a hardness H-900, while the base 38 is constructed from Aluminum (e.g. 7075 or 6061), however, other materials and strengthening techniques may be employed without departing from the scope of the invention.

Each strike plate 44 includes an elongated abutment section 152, a central strut section 154 extending generally perpendicularly from the abutment section 152, and a pair of flange members 156 extending generally laterally from the central strut section 154. The abutment section 152 spans a distance that is just short of the entire width of the base link 38 of the hinge assembly 34. The static strike plate 44 includes a generally planar upper surface 158, a generally planar lower surface 160, a generally planar abutment surface 162, a generally planar back surface 164, and a curved side surface 166 extending between the abutment surface 162 and the back surface 164. The curved side surfaces 166 define a pair of lobes 168 on either end of the abutment section 152, which each include an aperture 170 dimensioned to pass the mounting screws 50 (FIGS. 2-3) for the purpose of mounting the static strike plate 44 to the base 38 by threading the mounting screws 50 into the threaded apertures 76 of the base 38.

The lateral flanges 156 have a shorter height than the central strut 154. The flanges 156 are dimensioned to be slidably received within the strike plate undercuts 78 formed in the base 38 of the hinge assembly 34. The central strut 154 is dimensioned to be received within an upper gap forming part of strike plate recesses 74 in the base 38. The lower surface 160 of the central strut 154 serves to close off the upper section of the locking strut channel 68 of the base 38, essentially forming an upper boundary of the locking strut channel 68 so as to form a perimeter within which the elongated locking strut 36 may be positioned to lock and immobilize the hinge assembly 34 or from which the elongated locking strut 36 may be removed (from the middle link 40 and upper link 42) to unlock the hinge assembly 34. The locking strut 36 is dimensioned to traverse longitudinally within the channel 68 of the base 38 but cannot be removed during normal operation of the stringed musical instrument 10.

FIGS. 30-33 detail the construction of the static strike plate 48 according to aspects of the present invention. Each static strike plate 48 is generally "T" shaped and is dimensioned to be slidably engaged with the upper link 42 to accomplish two primary goals: (1) forming a "ceiling" for the internal channel 72 to snugly capture the elongated ramped strut 36 when inserted to lock the hinge assembly 34; and 2) forming the second abutment joint 60 in conjunction with an adjustable strike plate 46 to protect the underlying material of the upper link 42 during operation of the hinge assembly 34. In one embodiment, the strike plate 48 is constructed from stainless steel heat treated to a hardness H-900, while the upper link 42 is constructed from Aluminum (e.g. 7075 or 6061), however, other materials and strengthening techniques may be employed without departing from the scope of the invention.

Each strike plate 48 includes an elongated abutment section 172, a central strut section 174 extending generally perpendicularly from the abutment section 172, and a pair of flange members 176 extending generally laterally from the central strut section 174. The abutment section 172 spans a distance that is just short of the entire width of the upper link 42 of the hinge assembly 34. The static strike plate 48 includes a generally planar upper surface 178, a generally planar lower surface 180, a generally planar abutment surface 182, a generally planar back surface 184, and a curved side surface 186 extending between the abutment surface 182 and the back surface 184. The curved side surfaces 186 define a pair of lobes 188 on either end of the abutment section 172, which each include an aperture 190 dimensioned to pass the mounting screws 50 (FIGS. 2-3) for the purpose of mounting the static strike plate 48 to the upper link 42 by threading the mounting screws 50 into the threaded apertures 106 of the upper link 42.

The lateral flanges 176 have a shorter height than the central strut 174. The flanges 176 are dimensioned to be slidably received within the strike plate undercuts 108 formed in the upper link 42 of the hinge assembly 34. The central strut 174 is dimensioned to be received within an upper gap forming part of strike plate recesses 104 in the upper link 42. The lower surface 180 of the central strut 174 serves to close off the upper section of the locking strut channel 72 of the upper link 42, essentially forming an upper boundary of the locking strut channel 72 so as to form a perimeter within which the elongated locking strut 36 may be positioned to lock and immobilize the hinge assembly 34 or from which the elongated locking strut 36 may be removed (from the middle link 40 and upper link 42) to unlock the hinge assembly 34.

The abutment surfaces 162, 140, 182 of the strike plates 44, 46, 48 are preferably perpendicular to the upper surfaces 158, 136, 178 such that, when the base 38, middle link 40 and upper link 42 are the fully straightened and locked configuration, each adjacent abutment surface will be positioned flush against one another (vs. point loading) for maximum contact area and load distribution. The curved side surfaces of the strike plates 44, 46, 48 are preferably dimensioned to generally match the interior periphery of the respective strike plates recesses 74, 86, 104 when mounted to the base 38, middle link 40, and upper link 42, respectively.

The lateral flanges 156, 134, 176 of the strike plates 44, 46, 48 are preferably dimensioned to slidably engage within the undercuts 78, 88, 108 of the base 38, middle link 40, and upper link 42, respectively. When so assembled, the lower surfaces of the strike plates 44, 46, 48 form upper boundaries for the channels 68, 70, 72, respectively, such that the elongated strut 36 may be slidably advanced into, and wedged within, the channels 68, 70, 72 to thereby lock the hinge assembly 34 in the straightened state. To fold the hinge assembly 34, an actuator may be operated to slidably remove the wedge strut member 36 from the channels 70, 72 in the middle link 40 and upper link 42 such that the upper link 42 may be brought into position generally adjacent to the base 38.

To assemble the hinge assembly 34, the following procedure may be used, although the steps may be varied without departing from the scope of the invention: (1) the base 38 and middle link 40 are positioned such that the hinge pin bores 80 of the base 38 are co-aligned with the hinge pin bores 100 of the middle link 40; (2) hinge pins 54 are press-fit into the co-aligned bores 80, 100 to hingedly couple the base 38 and middle link 40; (3) the middle link 40 and upper link 42 are positioned such that the hinge pin bores 102 of the middle link 40 are co-aligned with the hinge pin bores 118 of the upper link 42; (4) hinge pins 58 are press-fit into the co-aligned bores 102, 118 to hingedly couple the middle link 40 and upper link 42; (5) with the base 38 and middle link 40 angled open relative to one another, strike plate 44 may be mounted to the base 38 by slidably advancing the lateral flanges 156 into the undercuts 78 and then screwing threaded screws 50 into the threaded bores 76 of the base 38; (6) with the base middle link 40 and upper link 42 angled open relative to one another, strike plate 48 may be mounted to the upper link 42 by slidably advancing the lateral flanges 176 into the undercuts 108 and then screwing threaded screws 50 into the threaded bores 106 of the upper link 42; (7) with the base 38 and middle link 40 angled open relative to one another, and with the middle link 40 and upper link 42 angled open relative to one another, the strike plates 46 may be slidably mounted into the middle link 40 by advancing the lateral flanges 134 into the undercuts 88 of the middle link 40. (8) selectively adjusting the threaded set screws 66 (via clockwise or counter-clockwise rotation) until the abutment surfaces 162, 140 of the base 38 and middle link 40 are in flush and full contact with one another when closed into a straightened state relative to one another; (9) selectively adjusting the threaded set screws 66 (via clockwise or counter-clockwise rotation) until the abutment surfaces 140, 182 of the middle link 40 and upper link 42 are in flush and full contact with one another when closed into a straightened state relative to one another; and (10) advancing the threaded locking screws 52 through the non-threaded apertures 150 of the strike plates 46 and into the threaded apertures 62 of the middle link 40 to secure the strike plates 46 in the desired position.

The adjustability feature described above provides the ability to ensure zero-gaps between the strike plates 44, 46, 48 of the hinge assembly 34, as well as co-planar surfaces of the hinge base 38, middle link 40, and upper link 42, during the process of assembling and setting up the hinge assembly 34. To re-adjust the hinge assembly 34 over time (after original manufacture), the threaded locking screws 52 must first be loosened (e.g. rotated counter-clockwise) before the threaded set screws 66 may be advanced in or out of the threaded bore 148 to selectively adjust the position of the middle strike plate 46. Once adjusted, each threaded locking screw 52 must be tightened (e.g. rotated clock-wise) to immobilize the middle strike plate 46 in the new position on the middle link 40. The strike plate adjustability feature of the hinge 34 accomplishes two (2) primary goals. (1) allowing one or more of the adjustable strike plates 46 to be selectively positioned in order to ensure full, parallel contact with the abutment surfaces of the static strike plate 44 and/or static strike plate 48; and (2) adjusting the rotational alignment of the middle link 40 relative to the base 38 and/or upper link 42 about the hinge pins 54, 58. The first goal helps maintain the neck 12 in a robust and consistent position when the elongated strut 36 is advanced fully into the hinge assembly 34 and the instrument 10 is used over time. The second goal helps ensure the top surfaces of the neck 12 are maintained in proper alignment over time for desired action and playability.

While described above using adjustment set screws 66 within the threaded bores 148 of the adjustable strike plate 46 to selectively adjust the position of the strike plates 46, it is also within the scope of the present invention to accomplish the strike plate adjustability via an externally driven manner, for example, one or more magnetically driven servo motors disposed within the middle section 40 that can be selectively adjusted over time to adjust the location of one or both strike plate 46.

When the hinge assembly 34 is straightened as shown in FIG. 1, each adjacent abutment surface 162, 140, 182 will be contacting one another (preferably in a parallel manner with maximum contact area between each abutment surface) to define the first abutment joint 56 (contact region) between the base 38 and the middle link 40, and the second abutment joint 60 (contact region) between the middle link 40 and upper link 42. The first and second contact regions 56, 60 are disposed generally along the upper surface of the hinge assembly 34 such that only the strike plates 44, 46 and 48 will be contacting on another along the upper region of the hinge assembly 34. In this manner, the underlying material used to construct the base section 38, middle section 40, and upper section 42 will be less likely to be deformed over time due to repetitive use. This is especially the case if the material used for the base section 38, middle section 40 and/or upper section 42 is softer or less durable than the material used for the strike plates 44, 46, 48. For example, if Aluminum is used for the hinge base 38, middle link 40 and/or upper link 42, then strike plates 44, 46, 48 made from hardened steel would bolster the overall durability of the hinge assembly 34 over time, given that the loads would be borne by the strike plates 44, 46, 48 and transferred into the respective hinge components, as opposed to having Aluminum bear those loads and deform over time.

FIGS. 34-38 detail the construction of the elongated locking strut 36 according to aspects of the present invention. The locking strut 36 includes a mounting section 200 on a first end and a curved distal section 202 at the opposite end. The mounting section 200 includes an aperture 204 dimensioned to receive a threaded mounting screw 206 (FIG. 5) for coupling the locking strut 36 to an actuator configured to selectively translate or otherwise longitudinally move the locking strut 36 under the direction of a user. The locking strut 36 includes a generally planar upper surface 208, a generally planar lower surface 210, a first generally planar side surface 212, and a second generally planar side surface 214. The mounting section 200 includes a stepped section 216 adjacent to the lower surface 210 and a raised section 218 adjacent to the upper surface 208. The stepped section 216 is dimensioned to accommodate the head of the mounting screw 206 while the raised section 218 includes a threaded interior to receive the threaded aspect of the mounting screw 206 to couple the locking strut 36 to an actuator (not shown).

The upper surface 208 is generally horizontal and the lower surface 210 is generally angled relative to the upper surface 208, which defines a locking strut angle. The locking strut angle may be any suitable range, such as (by way of example only) 1 degree to 5 degrees, with a preferred angle of approximately 2 degrees. As shown in FIG. 10, the locking strut angle should preferably match the angle of the locking strut channel 68, 70, 72 as it progresses from the base 38, middle link 40, and upper link 42. In so doing, the amount of friction between the locking strut 36 and the channel 68, 70, 72 may be minimized for the majority of the range of movement. Specifically, the friction will be minimal as the locking strut 36 until the curved distal section 72 is positioned at, within, or near the upper link 42. In similar fashion, the friction will be minimal as the locking strut 36 is removed from the middle link 40 and upper link 42. This friction will also be minimized based on the curved aspects of the curved distal section 72, which includes a top curved surface 220, a first curved side surface 222, and a second curved side surface 224. The top curved surface 220 matches the curvature of the lobes of the base 38 that include the hinge pin bores 80 (see FIG. 12). Collectively, the curved surfaces of the top curved surface 220 and the first and second curved side surfaces 222, 224 allow the distal region 202 to be easily advanced into and withdrawn from the locking strut channel 72 of the upper link 42. Between the "keyed" engagement between the angled locking strut 36 and the angled channels 68, 70, 72 within the base 38, middle link 40, and upper link 42, as well as the large cross-sectional volume of the locking strut 36, the hinge assembly 34 will be effectively maintained in the straightened configuration with negligible if any movement between the base 38, middle link 40, and upper link 42 when the locking strut 36 is fully engaged into the hinge assembly 34.

The locking strut 36 and the hinge assembly 34 may be constructed from any number of suitable materials, including but not limited to metal (e.g. aluminum), carbon-fiber, plastic, etc. . . . manufactured via any suitable techniques, including but not limited to machining, molding, 3D printing, etc. . . . . The strike plates 44, 46, 48 are preferably made of a highly robust and durable material relative to the material of the hinge base, middle hinge, and upper hinge, such that the strike plates will not deform or otherwise get negatively impacted from repeated contact during the folding and unfolding over the lifetime of the foldable stringed instrument. By way of example only, the strike plates 44, 46, 48 may be constructed from tool-grade steel heat treated to achieve hardness RC, although it will be appreciated that any number of suitable materials and/or hardness and/or durometers may be employed without departing from the present invention.

Any of the features or attributes of the above the above described embodiments and variations can be used in combination with any of the other features and attributes of the above described embodiments and variations as desired. From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A hinge assembly with reinforced abutments, comprising:
    an upper hinge member, a lower hinge member, and a middle hinge member hingedly coupled between said upper hinge member and said lower hinge member via at least one first connecting pin linking the upper hinge member to the middle hinge member and at least one second connecting pin linking the lower hinge member to the middle hinge member such that said hinge assembly is configured to be positioned into a straightened state and a folded state;
    the upper hinge member having an upper surface, a first recess formed along a first end of said upper surface, a first channel formed along a longitudinal axis of the upper hinge member, and at least one connecting pin bore dimensioned to receive said at least one first connecting pin;
    the lower hinge member having an upper surface, a second recess formed along a first end of said upper surface, a second channel formed along a longitudinal axis of the lower hinge member, and at least one connecting pin bore dimensioned to receive said at least one second connecting pin;
    the middle hinge member having an upper surface, a third recess formed along a first end of said upper surface, a fourth recess formed along a second end of said upper surface, a third channel formed along a longitudinal axis of the middle hinge member, at least one connecting bore dimensioned to receive said at least one first connecting pin, and at least one connecting bore dimensioned to receive said at least one second connecting pin;
    a lower strike plate dimensioned to be mounted to said lower hinge member adjacent to said third channel, said lower strike plate including an abutment surface extending generally perpendicularly between an upper surface and a lower surface of said lower strike plate;
    an upper strike plate dimensioned to be mounted to said upper hinge member adjacent to said third channel, said upper strike plate including an abutment surface extending generally perpendicularly between an upper surface and a lower surface of said upper strike plate;
    a pair of middle strike plates dimensioned to be mounted at opposite ends of said middle hinge member adjacent to said first channel and said second channel, respectively, said middle strike plates each including an abutment surface extending generally perpendicularly between an upper surface and a lower surface of said middle strike plates;
    a first abutment joint formed between said abutment surface of said lower strike plate mounted to said lower hinge member and the abutment surface of a first of said pair of middle strike plates mounted to said middle hinge member when said lower hinge member and said middle hinge member are in said straightened state with said upper surface of said lower hinge member generally co-planar with said upper surface of said middle hinge member;

a second abutment joint formed between said abutment surface of said upper strike plate mounted to said upper hinge member and the abutment surface of a second of said pair of middle strike plates mounted to said middle hinge member when said upper hinge member and said middle hinge member are in said straightened state with said upper surface of said upper hinge member generally co-planar with said upper surface of said middle hinge member; and an elongated strut member dimensioned to be advanced into said first channel, second channel and third channel when said lower hinge member, middle hinge member and upper hinge member are in said straightened state to lock said lower hinge member, middle hinge member and upper hinge member in said straightened state, wherein said elongated strut member is configured to be selectively withdrawn from at least said upper hinge member and said middle hinge member such that said upper hinge member, said middle hinge member and said lower hinge member are configured to be positioned into said folded state.

2. The hinge assembly of claim 1, wherein at least one of said middle strike plates is adjustable relative to said middle hinge member.

3. The hinge assembly of claim 1, wherein said middle strike plates include lateral flanges dimensioned to be slidably introduced into undercuts formed in said middle hinge member.

4. The hinge assembly of claim 1, wherein said lower surface of said middle strike plates form an upper boundary for said third channel formed in said middle hinge member to help retain said elongated strut member during use.

5. The hinge assembly of claim 1, wherein said lower surface of said lower strike plate forms an upper boundary for said second channel formed in said lower hinge member to help retain said elongated strut member during use.

6. The hinge assembly of claim 1, wherein said lower surface of said upper strike plate forms an upper boundary for said first channel formed in said upper hinge member to help retain said elongated strut member during use.

7. The hinge assembly of claim 1, wherein said lower strike plate is configured to be coupled to said lower hinge member via at least one of an adhesive and a machine screw.

8. The hinge assembly of claim 1, wherein said middle strike plates are configured to be coupled to said middle hinge member via at least one of an adhesive and a machine screw.

9. The hinge assembly of claim 1, wherein said upper strike plate is configured to be coupled to said upper hinge member via at least one of an adhesive and a machine screw.

10. The hinge assembly of claim 1, wherein said lower hinge member is mounted to a guitar body and said upper hinge member is mounted to a guitar neck.

11. The hinge assembly of claim 10, wherein said guitar body is an electric guitar body.

12. A hinge assembly with reinforced abutments, comprising:

an upper hinge member, a middle hinge member, a lower hinge member, at least one first connecting pin for coupling said upper hinge member to said middle hinge member, and at least one second connecting pin for coupling said middle hinge member to said lower hinge member such that said hinge assembly is configured to be positioned into a straightened state and a folded state;

said lower hinge member, said middle hinge member, and said upper hinge member each equipped with a central channel extending along a longitudinal axis, said central channel defined by a bottom surface, a first side surface, and a second side surface;

said lower hinge member, said middle hinge member, and said upper hinge member each equipped with at least one strike plate having: (a) a lower surface that forms an upper boundary for the central channel formed in said lower hinge member, said middle hinge member, and said upper hinge member; and (b) an abutment surface to collectively form: (i) a first abutment joint between the lower hinge member and middle hinge member, and (ii) a second abutment joint between the middle hinge member and the upper hinge member; and an elongated strut member dimensioned to be slidably advanced into said channels of said lower hinge member, said middle hinge member, and said upper hinge member when positioned into said straightened state to lock said hinge assembly in said straightened state, wherein said elongated strut member is configured to be selectively withdrawn from the channels of said middle hinge member and said upper hinge member so said hinge assembly is configured to be positioned into said folded state.

13. The hinge assembly of claim 12, wherein said strike plates include at least one adjustable strike plate dimensioned to be adjustably mounted to said middle hinge member.

14. The hinge assembly of claim 13, wherein said at least one adjustable strike plate includes at least two threaded apertures each dimensioned to threadably receive a set screw to adjust a position of said adjustable strike plate relative to said middle hinge member.

15. The hinge assembly of claim 14, wherein said at least one adjustable strike plate includes at least two non-threaded apertures each dimensioned to pass a threaded screw configured to be threadably engaged within a threaded aperture formed in said middle hinge member to mount said middle strike plate to said middle hinge member.

16. The hinge assembly of claim 14, wherein said middle hinge member is equipped with at least two elongated hardened rods each aligned with one of said set screws to form a foundation for said set screws to act against during adjustment of at least one adjustable strike plate.

17. The hinge assembly of claim 12, wherein said lower hinge member, said middle hinge member, and said upper hinge member are each equipped with a recess to mount at least one strike plate.

18. The hinge assembly of claim 12, wherein each of said at least one strike plates is configured to be coupled to said lower hinge member, said middle hinge member, and said upper hinge member via at least one of an adhesive and a machine screw.

19. The hinge assembly of claim 12, wherein said lower hinge member is mounted to a guitar body and said upper hinge member is mounted to a guitar neck.

20. The hinge assembly of claim 19, wherein said guitar body is an electric guitar body.

* * * * *